(12) United States Patent
Oley et al.

(10) Patent No.: US 10,748,450 B1
(45) Date of Patent: Aug. 18, 2020

(54) SYSTEM, APPARATUS, AND METHOD FOR CREATING AN INTERACTIVE AUGMENTED REALITY EXPERIENCE TO SIMULATE MEDICAL PROCEDURES FOR PEDIATRIC DISEASE EDUCATION

(71) Applicant: SPROUTEL, INC., Providence, RI (US)

(72) Inventors: Brian Oley, Jamaica Plain, MA (US); Hannah Chung, Providence, RI (US); Joel B. Schwartz, Providence, RI (US); Aaron J. Horowitz, Providence, RI (US)

(73) Assignee: Sproutel, Inc., Providence, RI (US)

( * ) Notice: Subject to any disclaimer, the term of this patent is extended or adjusted under 35 U.S.C. 154(b) by 347 days.

(21) Appl. No.: 15/824,981

(22) Filed: Nov. 28, 2017

Related U.S. Application Data

(60) Provisional application No. 62/427,753, filed on Nov. 29, 2016.

(51) Int. Cl.
*G09B 23/30* (2006.01)
*A63H 3/00* (2006.01)
*G09B 5/00* (2006.01)

(52) U.S. Cl.
CPC .............. *G09B 23/30* (2013.01); *A63H 3/001* (2013.01); *G09B 5/00* (2013.01)

(58) Field of Classification Search
None
See application file for complete search history.

(56) References Cited

U.S. PATENT DOCUMENTS 5,842,870 A * 12/1998 Cramer .................. A63H 3/003
434/267
6,761,637 B2    7/2004 Weston et al.
(Continued)

FOREIGN PATENT DOCUMENTS

CN       104952287 A    9/2015
GB         2508347 A    6/2014
(Continued)

OTHER PUBLICATIONS

Scanimalz; Scanimalz from Wicked Cool Toys; May 23, 2013; https://www.youtube.com/watch?v=yLI78Pd68wo (Year: 2013).*
(Continued)

*Primary Examiner* — Eddy Saint-Vil
*Assistant Examiner* — William D Ermlick
(74) *Attorney, Agent, or Firm* — Renaissance IP Law Group, LLP; David A. Crowther

(57) ABSTRACT

An interactive augmented reality system for simulating medical procedures for pediatric disease education includes a plush toy having one or more patches disposed on a body of the plush toy in one or more corresponding locations each associated with an area of the body of the plush toy that is comparable to an area of a human body. An interactive medical procedure simulation logic section operable within a mobile device causes a particular patch within a series of live images to be scanned, and initiates an interactive augmented reality experience to simulate a medical procedure for pediatric disease education. Comfort is provided to children struggling with a disease. Children learn how to manage their chronic illness by enabling them to practice their medical procedures and receive feedback related to correct and incorrect care. A low-cost disease education delivery mechanism is provided directly to children through game-play.

16 Claims, 20 Drawing Sheets

(56) References Cited

U.S. PATENT DOCUMENTS

| | | | |
|---|---|---|---|
| 7,967,657 B2 | 6/2011 | Ganz | |
| 8,413,882 B1 * | 4/2013 | Nidamarthi | G06Q 30/00 235/375 |
| 8,475,275 B2 | 7/2013 | Weston et al. | |
| 8,500,511 B2 | 8/2013 | Ganz | |
| D714,884 S * | 10/2014 | Horowitz | D21/605 |
| 9,126,122 B2 | 9/2015 | Boeckle | |
| 9,323,323 B2 | 4/2016 | Kleksiev et al. | |
| 9,352,213 B2 | 5/2016 | Yim et al. | |
| 9,390,626 B1 | 7/2016 | Horowitz et al. | |
| 9,480,929 B2 | 11/2016 | Weston | |
| 9,569,562 B2 | 2/2017 | Bulaj et al. | |
| 10,010,379 B1 * | 7/2018 | Gibby | A61B 90/94 |
| 10,026,226 B1 * | 7/2018 | Lotto | G06T 19/006 |
| 10,140,773 B2 * | 11/2018 | Short | G06T 19/006 |
| 10,146,299 B2 * | 12/2018 | Seichter | G06F 3/011 |
| 10,360,810 B1 * | 7/2019 | Horowitz | G09B 5/04 |
| 2003/0091150 A1 * | 5/2003 | Barber | A61B 6/107 378/189 |
| 2007/0039624 A1 | 2/2007 | Roberts et al. | |
| 2008/0214089 A1 | 9/2008 | Vermac et al. | |
| 2009/0017430 A1 * | 1/2009 | Muller-Daniels | G09B 23/30 434/262 |
| 2009/0170056 A1 | 7/2009 | Nam et al. | |
| 2009/0286210 A1 * | 11/2009 | Spreen | G09B 21/009 434/112 |
| 2009/0322671 A1 * | 12/2009 | Scott | G06K 9/32 345/156 |
| 2010/0039506 A1 * | 2/2010 | Sarvestani | A61B 90/361 348/65 |
| 2010/0203489 A1 * | 8/2010 | Koster | G09B 23/285 434/267 |
| 2011/0046935 A1 * | 2/2011 | Sugaya | G06F 19/3481 703/11 |
| 2011/0105895 A1 * | 5/2011 | Kornblau | A61B 34/20 600/426 |
| 2011/0181497 A1 * | 7/2011 | Raviv | G02B 27/017 345/8 |
| 2012/0009845 A1 | 1/2012 | Schmelzer | |
| 2012/0259230 A1 * | 10/2012 | Riley | A61B 5/1072 600/477 |
| 2012/0270196 A1 * | 10/2012 | Hettrick | G09B 23/28 434/262 |
| 2012/0292383 A1 * | 11/2012 | Leinicke | G09B 5/062 235/375 |
| 2012/0308973 A1 | 12/2012 | Marsac et al. | |
| 2013/0093829 A1 * | 4/2013 | Rosenblatt | G09B 5/00 348/14.01 |
| 2013/0237811 A1 * | 9/2013 | Mihailescu | A61B 8/4438 600/424 |
| 2014/0028712 A1 * | 1/2014 | Keating | G06T 19/006 345/633 |
| 2014/0062900 A1 * | 3/2014 | Kaula | A61N 1/37247 345/173 |
| 2014/0113552 A1 | 4/2014 | Siddiqui | |
| 2014/0125678 A1 | 5/2014 | Wang et al. | |
| 2014/0272863 A1 * | 9/2014 | Kim | G09B 23/28 434/262 |
| 2014/0275760 A1 * | 9/2014 | Lee | A61B 1/00045 600/102 |
| 2014/0314327 A1 * | 10/2014 | Elliott | A63H 3/28 382/209 |
| 2015/0024837 A1 | 1/2015 | Ganz | |
| 2015/0044653 A1 * | 2/2015 | Levine | G09B 7/08 434/262 |
| 2015/0050972 A1 | 2/2015 | Sarrafzadeh et al. | |
| 2015/0056588 A1 | 2/2015 | Bayer | |
| 2015/0133025 A1 | 5/2015 | Ponomarev et al. | |
| 2015/0150490 A1 * | 6/2015 | Xu | A61B 5/6898 600/407 |
| 2015/0182757 A1 * | 7/2015 | Levine | A61H 23/00 601/46 |
| 2015/0297179 A1 * | 10/2015 | Mander | A61B 8/4427 600/440 |
| 2015/0310668 A1 * | 10/2015 | Ellerbrock | H04N 13/239 345/633 |
| 2015/0328554 A1 | 11/2015 | Boeckle | |
| 2016/0019016 A1 | 1/2016 | Kochavi | |
| 2016/0027219 A1 * | 1/2016 | Nuzzi | G06T 19/006 345/633 |
| 2016/0029962 A1 | 2/2016 | Hyde et al. | |
| 2016/0051146 A1 * | 2/2016 | Eaton | A61B 5/0002 235/380 |
| 2016/0125765 A1 * | 5/2016 | Meretei | G09B 5/02 434/262 |
| 2016/0133056 A1 * | 5/2016 | Lampotang | G09B 23/285 345/419 |
| 2016/0135762 A1 * | 5/2016 | Mihailescu | A61B 6/027 600/424 |
| 2016/0174901 A1 | 6/2016 | Majic | |
| 2016/0184724 A1 * | 6/2016 | Butler | G06F 3/0346 446/484 |
| 2016/0242744 A1 * | 8/2016 | Mihailescu | A61B 8/4444 |
| 2016/0249989 A1 * | 9/2016 | Devam | A61B 5/024 345/633 |
| 2016/0358331 A1 * | 12/2016 | Sharma | G06T 7/0012 |
| 2017/0004382 A1 * | 1/2017 | Inoue | G06T 19/006 |
| 2017/0017301 A1 * | 1/2017 | Doornenbal | G06F 3/04845 |
| 2017/0079576 A1 * | 3/2017 | Stroebech | A61F 5/445 |
| 2017/0112439 A1 * | 4/2017 | Dubin | A61B 5/7285 |
| 2017/0116729 A1 * | 4/2017 | Stolka | G06T 5/001 |
| 2018/0074639 A1 * | 3/2018 | Powell | G06F 3/0383 |
| 2018/0082480 A1 * | 3/2018 | White | A61B 50/33 |
| 2018/0225992 A1 * | 8/2018 | Gonsalves | G09B 23/28 |
| 2018/0293802 A1 * | 10/2018 | Hendricks | G06T 19/006 |
| 2018/0318723 A1 * | 11/2018 | Weston | A63H 3/00 |
| 2018/0322702 A1 * | 11/2018 | Djajadiningrat | A61B 5/0404 |
| 2019/0057620 A1 * | 2/2019 | Eggert | G09B 23/281 |
| 2019/0130792 A1 * | 5/2019 | Rios | G09B 23/285 |
| 2019/0149767 A1 * | 5/2019 | Turbell | H04N 7/141 |
| 2019/0239850 A1 * | 8/2019 | Dalvin | A61B 8/463 |
| 2019/0365498 A1 * | 12/2019 | Gibby | A61B 5/066 |
| 2019/0374291 A1 * | 12/2019 | Stolka | A61B 5/055 |

FOREIGN PATENT DOCUMENTS

| | | |
|---|---|---|
| WO | 2001069830 A3 | 6/2002 |
| WO | 2015192117 A1 | 12/2015 |
| WO | 2017123175 A1 | 7/2017 |

OTHER PUBLICATIONS

ScanChannel; "How to Scan a QR Code"; Jun. 13, 2012; (Year: 2012).*

A Talking Teddy Bear Practicing in the Pediatric Hospital, Jun. 3, 2015; https://www.nytimes.com/2015/06/04/technology/huggable-robot-therapeutic-value-hospitals.html.

Lenny the Lion, http://www.lenny-diabetes.com.

mySugr Junior, https://mysugr.com/apps/.

Scanimals, http://awesometoyblog.com/2013/02/25/toy-fair-2013-scanimals-combine-plush-toys-and-qr-codes/, Feb. 25, 2013.

Smart teddy bear knows how you feel, Tracy Staedter, Discovery News, Aug. 15, 2006.

* cited by examiner

SYSTEM, APPARATUS, AND METHOD FOR CREATING AN INTERACTIVE AUGMENTED REALITY EXPERIENCE TO SIMULATE MEDICAL PROCEDURES FOR PEDIATRIC DISEASE EDUCATION

RELATED APPLICATION DATA

This application claims the benefit of U.S. Provisional Patent Application Ser. No. 62/427,753, filed on Nov. 29, 2016, the contents of which are hereby incorporated by reference.

GOVERNMENT FUNDING

This invention was made with government support under Grant No. 1R43DK105661 awarded by the National Institutes of Health. The government has certain rights in the invention.

TECHNICAL FIELD

This application pertains to pediatric medicine, and more particularly, to a system, apparatus, and method for creating interactive augmented reality experiences for children using simulated medical procedures on plush toys, and for facilitating pediatric disease education.

BACKGROUND

When a person is diagnosed with a chronic illness, their life changes overnight. All of a sudden they must learn how to manage their medical condition and learn how to adapt their lifestyle. When a child is diagnosed with a chronic illness, the difficulty is compounded even more. The child often does not have the maturity level that is necessary to effectively process the feelings of isolation and fear. It creates difficulty not only for the child, but also for the child's parents and doctors.

For children, a diagnosis of illness can be scary and isolating, and for their parents, a diagnosis can be overwhelming Often times children have a hard time conceptualizing illness. They may also feel isolated since their peers cannot directly relate to their experience with illness. Parents are entrusted by doctors to not only care for their child's illness, but also to educate their children about how to manage their disease. For parents, it can be difficult and stressful to transfer complex disease care information to their children. Similarly, doctors have difficulty explaining illness to children and helping to comfort them during diagnosis and follow up visits. When a child is diagnosed with an illness, they often need an immense amount of education and training to become proficient in self-management.

Conventional methods of education require one-on-one counseling with a doctor or nurse educator and occur in short sessions. It is not cost effective to provide the longer term support that families often need to become proficient in disease care. Moreover, conventional methods of disease-related education are geared towards parents and caregivers, relying on parents to pass relevant information on to children and furthering the child's feelings of isolation.

Accordingly, a need remains for improved methods and systems for assisting children who have been diagnosed with a disease. Embodiments of the inventive concept address these and other limitations in the prior art.

Figure 1A:
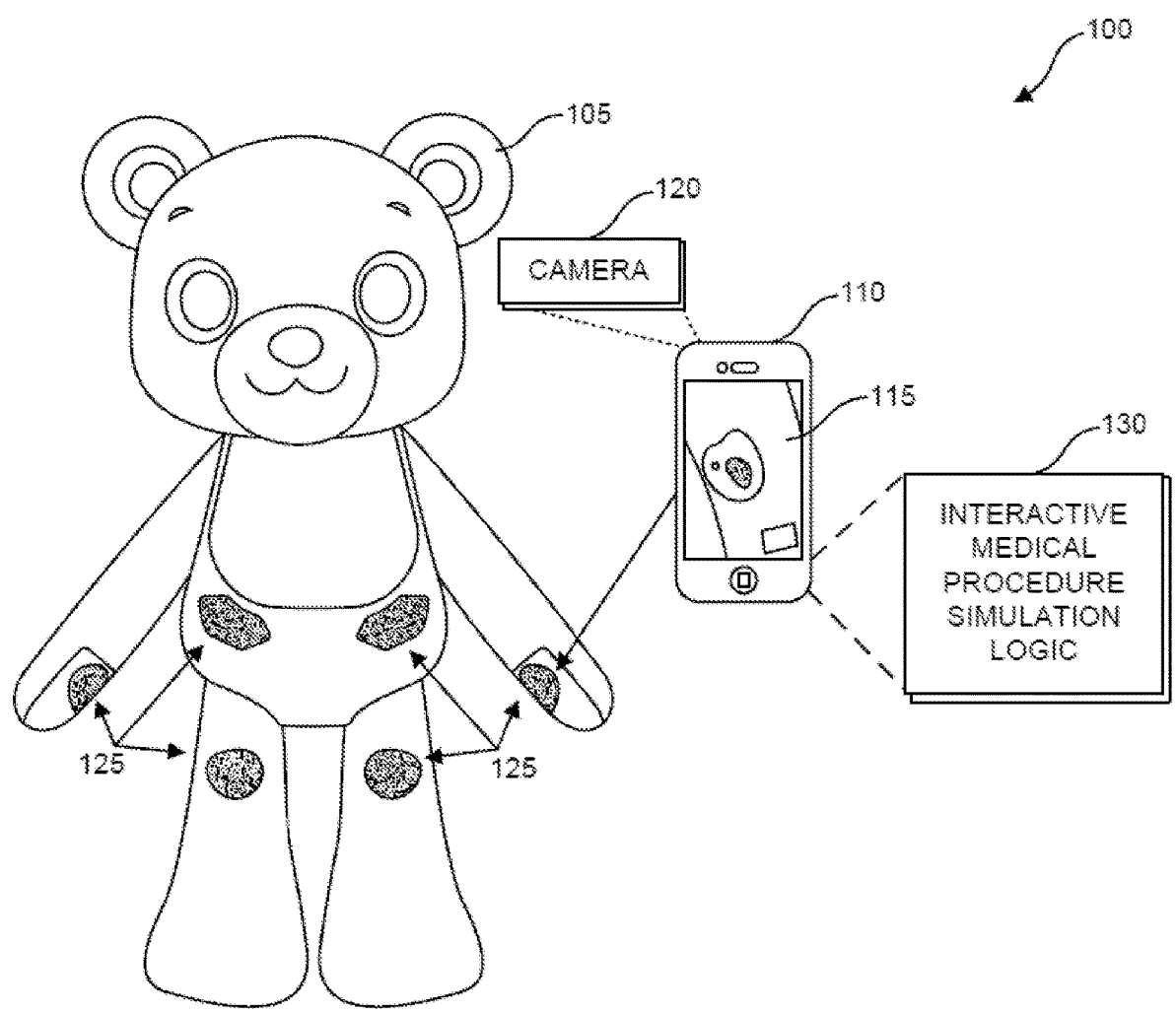
FIG. 1A illustrates a system for creating an interactive augmented reality experience to simulate medical procedures for pediatric disease education in accordance with some embodiments of the inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first patch could be termed a second patch, and, similarly, a second patch could be termed a first patch, without departing from the scope of the inventive concept.

It will be understood that when an element or layer is referred to as being "on," "coupled to," or "connected to" another element or layer, it can be directly on, directly coupled to, or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept provide comfort to children struggling with a disease by providing a friend who is just like them. In addition, embodiments disclosed herein help children learn how to manage their chronic illness by enabling them to practice their medical procedures and receive feedback related to correct and incorrect care. Embodiments include a low-cost disease education delivery mechanism. Moreover, embodiments disclosed herein provide an education directly to children through game-play.

Interactive digital disease care tools on a user's mobile device are provided. Upon recognition of uniquely identifiable patterns disposed on a plush toy by the mobile device, an augmented reality viewer and associated experience is enabled, which guides a child through a disease-care simulation. Near-field communication (NFC) chips need not be used, although embodiments do not preclude the use of NFC. Given that the display of the mobile device provides the augmented reality experience, a head-mounted display need not be used, although the use of a head-mounted display is not precluded.

Figure 1B:
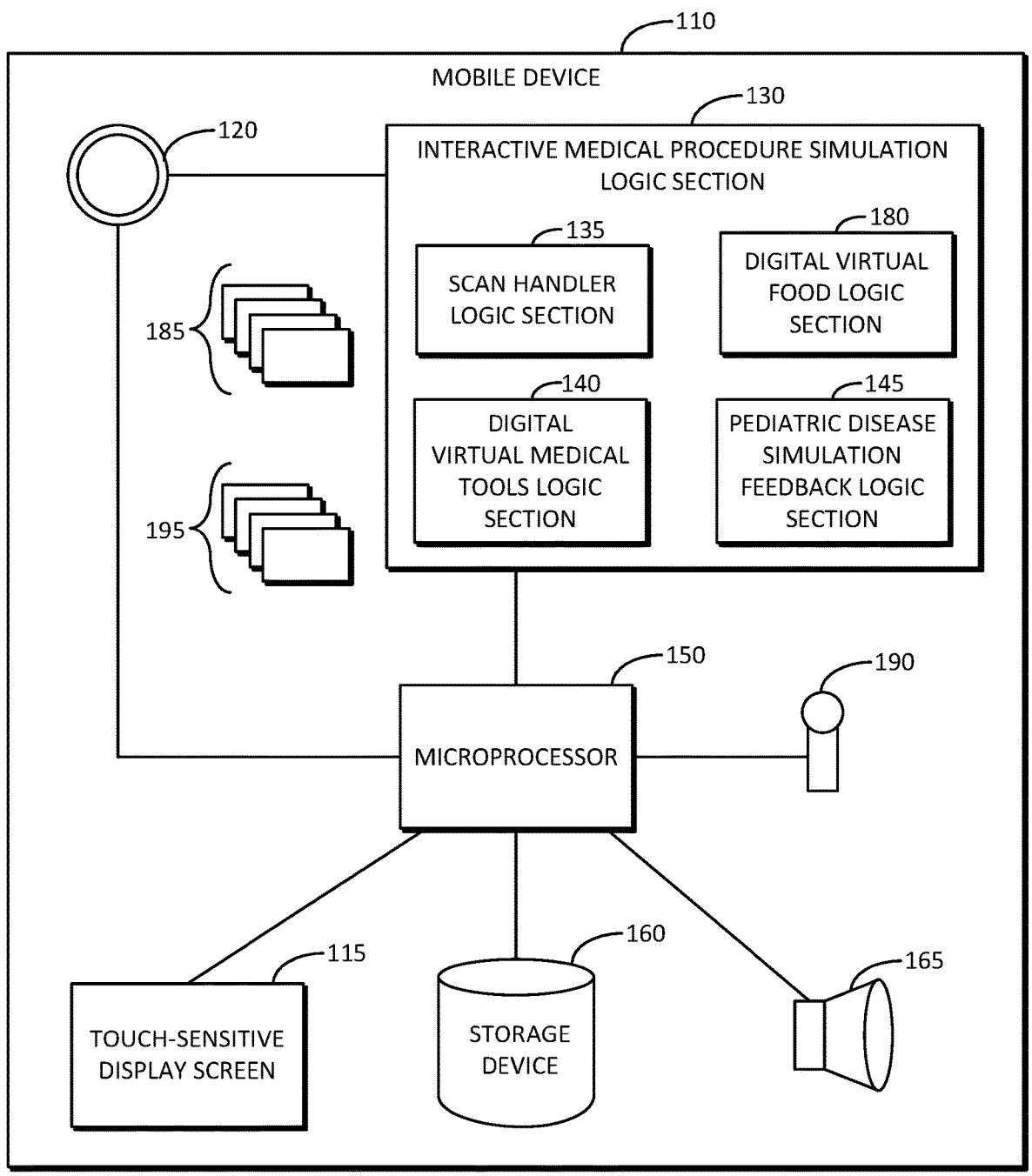
FIG. 1B illustrates logic section components of an interactive medical procedure simulation logic section operable within a mobile device in accordance with some embodiments of the inventive concept.

FIG. 1A illustrates a system 100 for creating an interactive augmented reality experience to simulate medical procedures for pediatric disease education in accordance with some embodiments of the inventive concept. FIG. 1B illustrates logic section components of an interactive medical procedure simulation logic section 130 operable within a mobile device 110 in accordance with some embodiments of the inventive concept. Reference is now made to FIGS. 1A and 1B.

The interactive augmented reality system 100 for simulating medical procedures for pediatric disease education can include a plush toy 105. The plush toy 105 can be, for example, a plush animal, a plush character, or other suitable object that is inviting to children. The plush toy 105 can include one or more uniquely identifiable patches 125 as disposed at various locations on the plush toy 105. The uniquely identifiable patches 125 can be placed on the plush toy 105 corresponding to key areas where the child will interact with the plush toy 105 to provide medical care. The uniquely identifiable patches 125 can be made of cloth material, plastic, metal, or any other suitable material. In some embodiments, one or more of the uniquely identifiable patches 125 is an adhesive sticker, which can be moved from one location of the plush toy 105 to another location of the plush toy 105 by the user patient. The adhesive sticker can have a uniquely identifiable pattern printed on it so that it can be scanned and recognized by the mobile device 110, as further described below.

The interactive augmented reality system 100 for simulating medical procedures for pediatric disease education can include a mobile device 110 such as a smart phone or tablet. The mobile device 110 can include one or more sensors and/or cameras (e.g., 120) configured to scan one or more of the uniquely identifiable patches 125 using a built-in visible light camera 120 of the mobile device 110. The mobile device 110 can include an interactive medical procedure simulation logic section 130 that is configured to produce the augmented reality experience to simulate medical procedure for pediatric disease education, as further described below.

The interactive medical procedure simulation logic section 130 enables user patients to scan the uniquely identifiable patches 125 on the plush toy 105 with a camera of their mobile device 110. Upon recognition of a particular uniquely identifiable patch 125, an animation begins and is displayed on a touch-sensitive display screen 115 of the mobile device 110. The user patient can be notified that the interactive medical procedure simulation logic section 130 has identified the given uniquely identifiable patch 125. The interactive medical procedure simulation logic section 130 can then display disease care tools in an augmented reality fashion.

The user patient can interact with the disease care tools and provide medical care to the plush toy 105 through augmented reality as if they were using real medical devices on a human with the same illness. The interactive medical procedure simulation logic section 130 can include a simulation of the disease and thus provides appropriate feedback to the user patient as they are administering medical procedures. The interactive medical procedure simulation logic section 130 can further provide feedback to the user patient after the medical procedure has been completed based on how effective the procedure was at treating and managing the disease simulation.

In some embodiments, the one or more of the uniquely identifiable patches 125 can be in the form of an adhesive sticker, which simulates a virtual insulin pump site via the display screen 115 of the mobile device 110. User patients can move the sticker around the plush toy 105, much like they need to move around their own infusion site. When the uniquely identifiable patch and/or sticker is recognized by the mobile device 110, a digital virtual infusion site can appear on the display screen 115 of the mobile device 110. This feature adds an additional layer to how physical play with the plush toy 105 translates into an augmented virtual reality world for the user patient.

More specifically, the interactive augmented reality system 100 for simulating medical procedures for pediatric disease education can include a plush toy 105 having one or more patches 125 disposed on a body of the plush toy 105 in one or more corresponding locations each associated with an area of the body of the plush toy 105 that is comparable to an area of the human body. The interactive augmented reality system 100 for simulating medical procedures for pediatric disease education can include an interactive medical procedure simulation logic section 130, as shown in FIG. 1B, which is operable within the mobile device 110. The mobile device 110 can include the visible light camera 120, which can capture a series of live images (e.g., 185 or 195)

of the plush toy 105 having the one or more patches 125. The mobile device 110 can display the series of live images 185 on a touch-sensitive display screen 115 of the mobile device 110.

The interactive medical procedure simulation logic section 130 can cause a particular patch from among the one or more patches 125 within the series of live images 185 to be scanned, and can initiate an interactive augmented reality experience to simulate a medical procedure for pediatric disease education responsive to the scanned particular patch.

As illustrated in FIG. 1B, the interactive medical procedure simulation logic section 130 can include a scan handler logic section 135, a digital virtual food logic section 180, a digital virtual medical tools logic section 140, and a pediatric disease simulation feedback logic section 145, which are each described in detail below. The mobile device 110 can further include a microprocessor 150. The microprocessor 150 can execute logic independently of or in cooperation with the interactive medical procedure simulation logic section 130. The mobile device 110 can further include a storage device 160, which can store data received from the camera 120, the microprocessor 150, the touch-sensitive display screen 115, the microphone 190, and/or the interactive medical procedure simulation logic section 130. The storage device 160 can be any suitable non-volatile or volatile memory or storage medium. The mobile device 110 can further include a speaker 165 to emit audible sounds and a microphone 190 to capture audible sounds.

Figure 2:
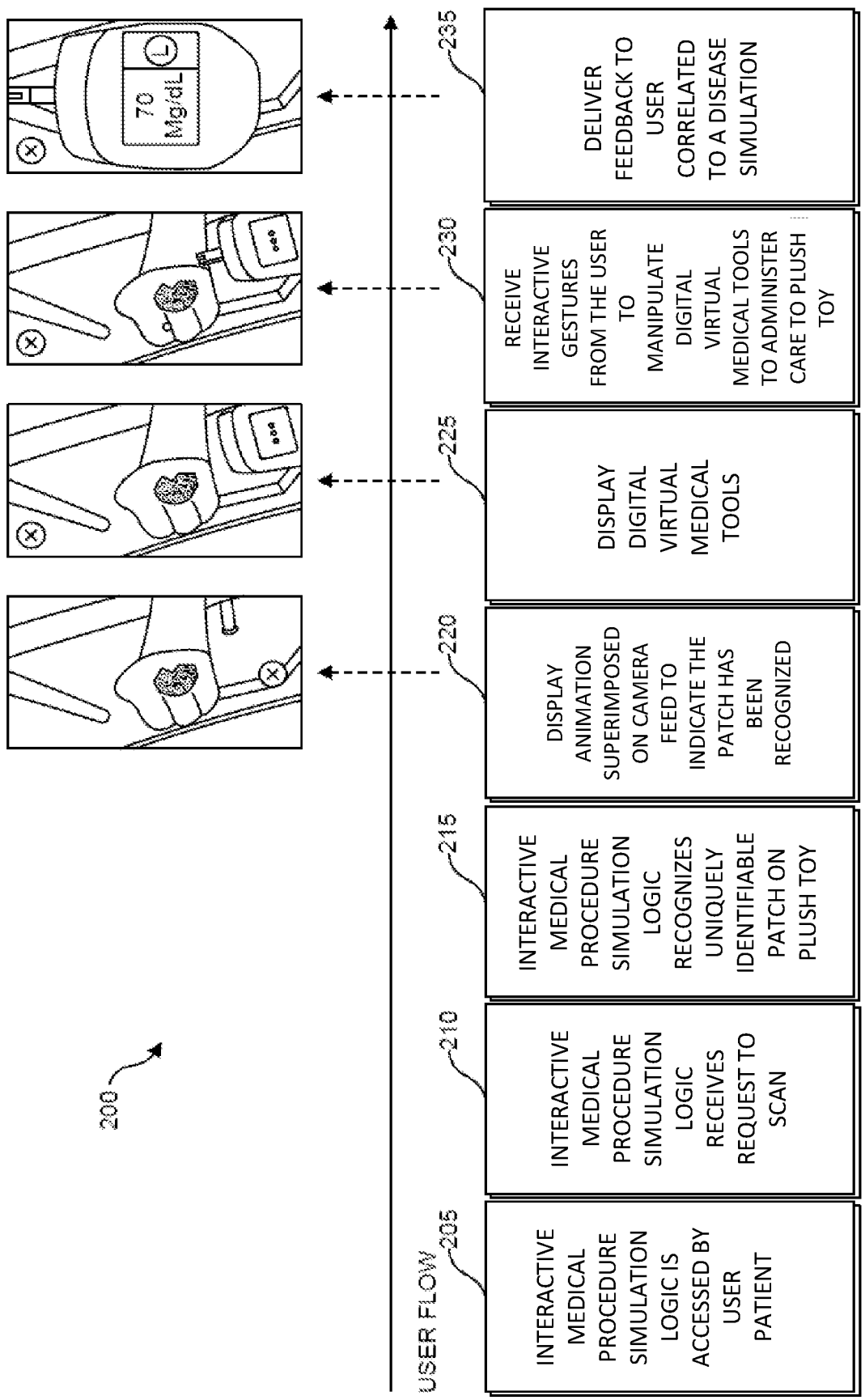
FIG. 2 is a flow diagram illustrating a technique for creating an interactive augmented reality experience to simulate medical procedures for pediatric disease education in accordance with some embodiments of the inventive concept.

FIG. 2 is a flow diagram 200 illustrating a technique for creating an interactive augmented reality experience to simulate medical procedures for pediatric disease education in accordance with some embodiments of the inventive concept. The technique begins at 205, where the interactive medical procedure simulation logic section 130 is accessed by a user patient, for example, through a mobile application on the mobile device 110. At 210, the interactive medical procedure simulation logic section 130 receives a request to scan. The request can be in the form of the user patient selecting a region of the touch-sensitive display screen 115, making a finger gesture on the touch-sensitive display screen 115, and/or by way of audible request through the microphone 190 of the mobile device 110. In some embodiments, the scanning functionality can show a live camera preview from the camera on the mobile device 110.

At 215, the interactive medical procedure simulation logic section 130 can process and automatically recognize the uniquely identifiable patch 125 that was scanned. At 220, the interactive medical procedure simulation logic section 130 can cause an animation to be superimposed on a camera feed to indicate the uniquely identifiable patch 125 has been recognized, and that further interactive simulated medical procedures are available. In some embodiments, the camera feed is live in the sense that it is capturing images through a camera of the mobile device 110 while the simulated medical procedures are made available. In an alternate embodiment, a still frame is captured of the plush toy 105 at the time the scan occurs, and the simulated medical procedures take place with respect to the plush toy 105 shown in the still frame.

At 225, the interactive medical procedure simulation logic section 130 can cause digital medical tools to be displayed on the display screen 115 of the mobile device 110. At 230, the interactive medical procedure simulation logic section 130 can receive interactive gestures from the user patient through the touch-sensitive display screen 115 to manipulate the digital medical tools to administer care to the plush toy 105. For example, the user patient must complete medical procedures in the correct order to appropriately provide care to the plush toy 105. At 235, the interactive medical procedure simulation logic section 130 can generate feedback and cause the feedback to be delivered to the user patient, in which the feedback is correlated to the disease simulation. In this manner, an augmented reality experience to simulate a medical procedure for a chronic illness is made possible, and the user patient can be notified whether they have completed the procedure correctly, or whether the procedure was appropriate to effectively care for the plush toy 105.

Accordingly, children having chronic illnesses can be educated at home through free-play with the plush toy 105 and the mobile device 110. Alternatively or in addition, patient education can be provided in a doctor's office by using the system 100 described above as a demonstration tool to show how to correctly administer medical procedures.

Comfort and entertainment is provided, both for children at home as well as in the hospital or other healthcare provider facilities. Information and interactive virtual assets are used to allow children to gain hands-on experience learning about disease management. Further, through the process described above, children can interact with a virtual disease simulation that provides feedback through audio and visual modes to educate children about the impact of correct and incorrect disease care. This method can also be used to help children log their own medical information for later transmission to doctors and caregivers.

FIGS. 3-15 illustrate example steps using the system 100 for creating an interactive augmented reality experience to simulate medical procedures for pediatric disease education in accordance with some embodiments of the inventive concept. Reference to FIGS. 3-15 is also made with reference to components of FIGS. 1A and 1B.

Figure 3:
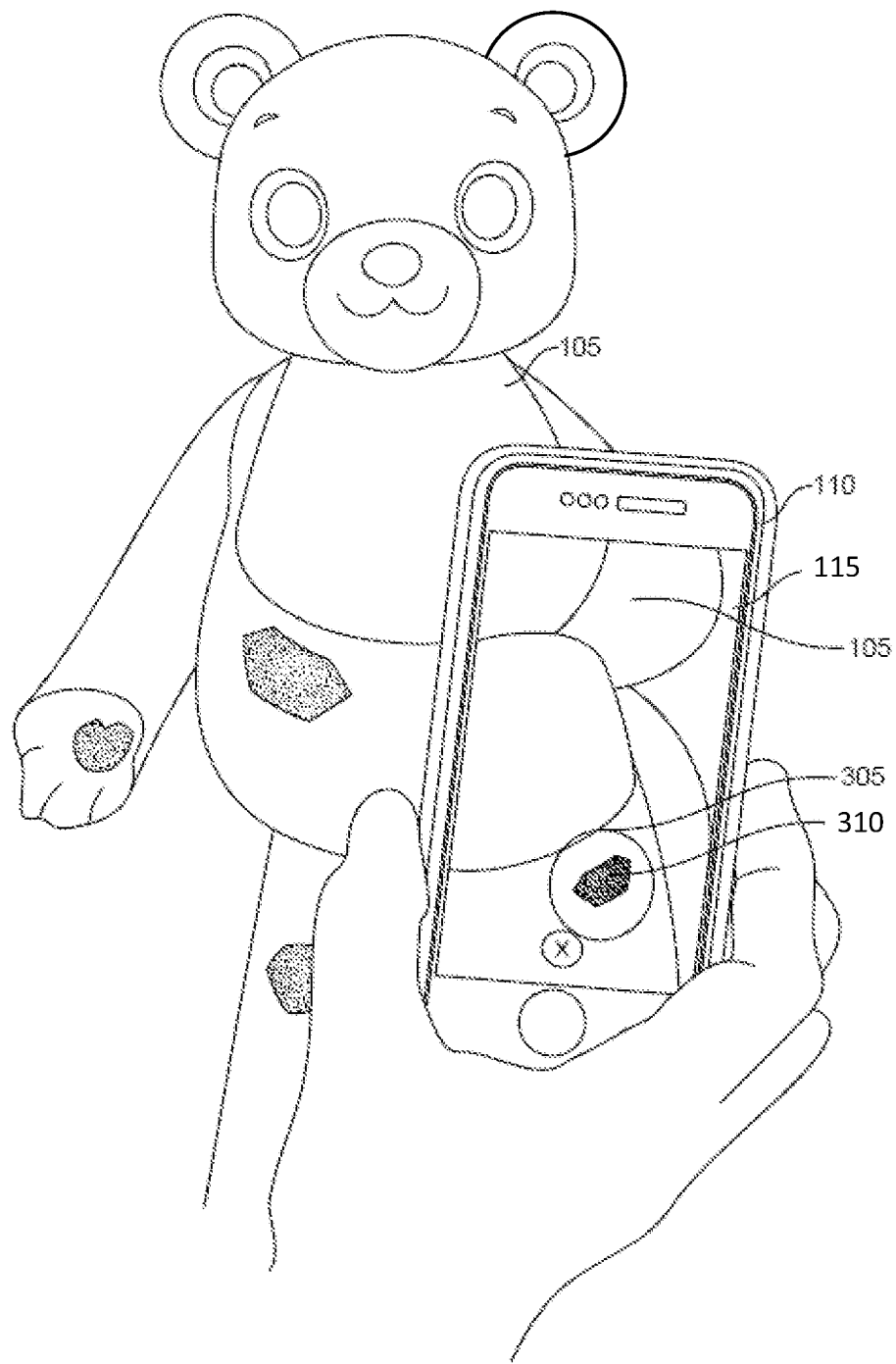
FIGS. 3-15 illustrate example steps using the system for creating an interactive augmented reality experience to simulate medical procedures for pediatric disease education in accordance with some embodiments of the inventive concept.

As shown in FIG. 3, the mobile device 110 can be used in a scan mode to scan a uniquely identifiable patch 310 from among the one or more patches 125. The interactive medical procedure simulation logic section 130 can cause an animation 305 to be superimposed on the camera feed around the patch 310 to indicate the uniquely identifiable patch 310 has been recognized. The animation 305 can be in the form of a circle, for example. The animation 305 can be in the form of a circle having a gradually increasing diameter for a predefined period of time. It will be understood that the animation 305 can include other shapes such as stars, triangles, or the like. It will be understood that any suitable animation 305 that indicates that the patch 310 has been selected and/or recognized can be used.

In some embodiments, the scan handler logic section 135 of the interactive medical procedure simulation logic section 130 can receive a scan request from a user patient via the touch-sensitive display screen 115 to scan the particular patch 310 from among the one or more patches 125 within the series of live images 185. In some embodiments, the scan handler logic section 135 can automatically scan the particular patch 310 from among the one or more patches 125 within the series of live images 185. The scan handler logic section 135 can recognize the scanned particular patch 310. The scan handler logic section 135 can cause the animation 305 to be superimposed on the series of live images 185 of the plush toy 105 to indicate to a user patient that the scanned particular patch 310 has been recognized.

Figure 4:
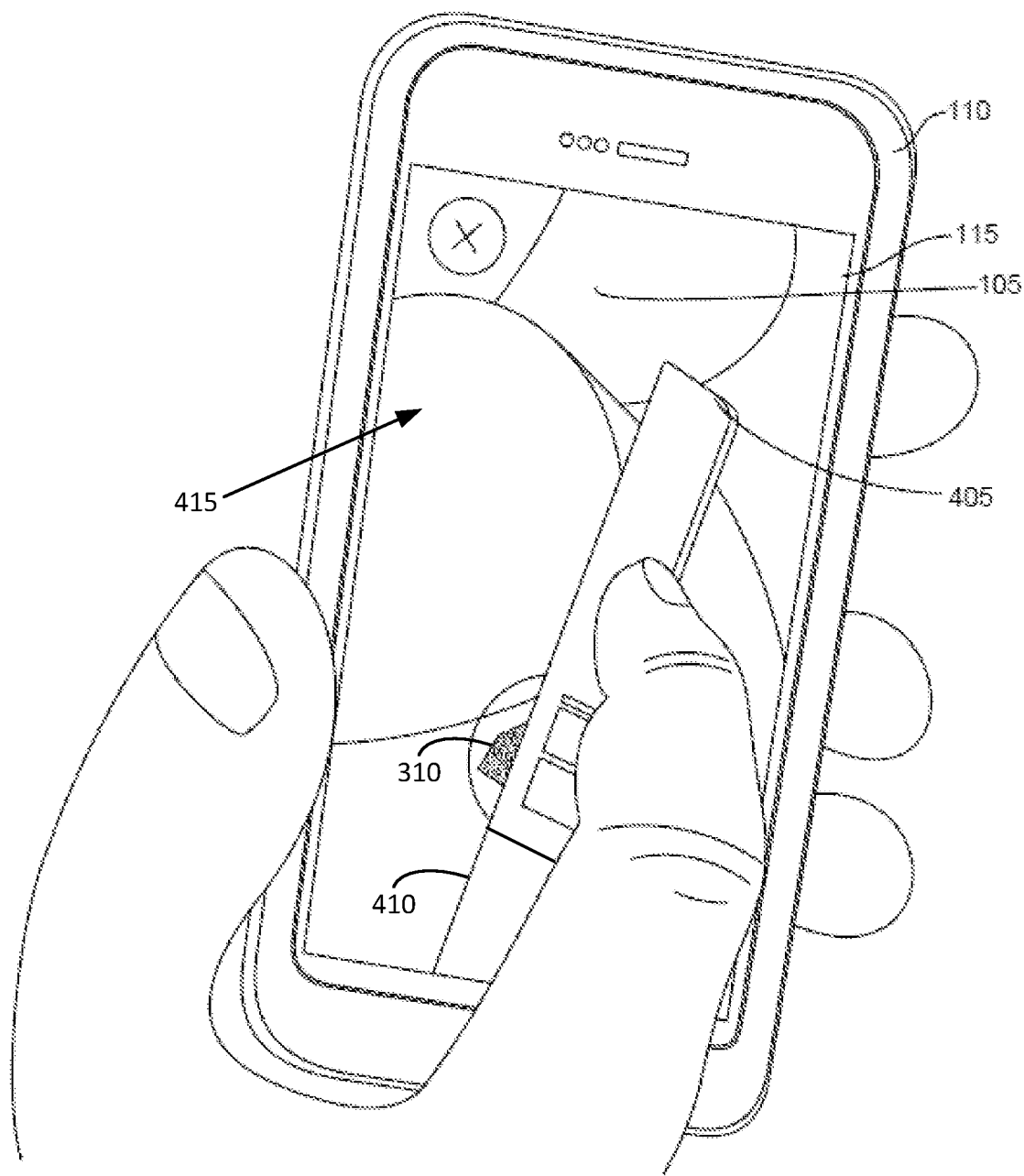

Referring to FIG. 4, the interactive medical procedure simulation logic section 130 can cause a still frame 415 including the scanned particular patch 310 and at least a portion of the body of the plush toy 105 to be displayed on the display screen 115. The interactive medical procedure simulation logic section 130 can include a digital virtual medical tools logic section 140, which can display or cause to be displayed one or more digital virtual medical tools (e.g., 410) superimposed over the still frame 415. For example, a digital virtual disease care tool such as a digital virtual insulin pen 410 can be presented to the user patient through the touch-sensitive display screen 115. The digital virtual insulin pen 410 can include a digital virtual cap 405.

The digital virtual medical tools logic section 140 can receive one or more interactive gestures from a user patient via the touch-sensitive display screen 115 to manipulate the one or more digital virtual medical tools (e.g., 410) to administer virtual medical care to the plush toy 105. For example, the user patient can remove the digital virtual cap 405 of the insulin pen 410 by sliding it off with a finger sliding gesture on the touch-sensitive display screen 115.

More specifically, the one or more digital virtual medical tools can include a digital virtual insulin pen 410 having a digital virtual cap 405. The digital virtual medical tools logic section 140 can display or cause to be displayed the digital virtual insulin pen 410 having the digital virtual cap 405 superimposed over the still frame 415. The digital virtual medical tools logic section 140 can receive one or more sliding gestures from the user patient via the touch-sensitive display screen 115 to remove the digital virtual cap 405 from the digital virtual insulin pen 410.

Figure 5:
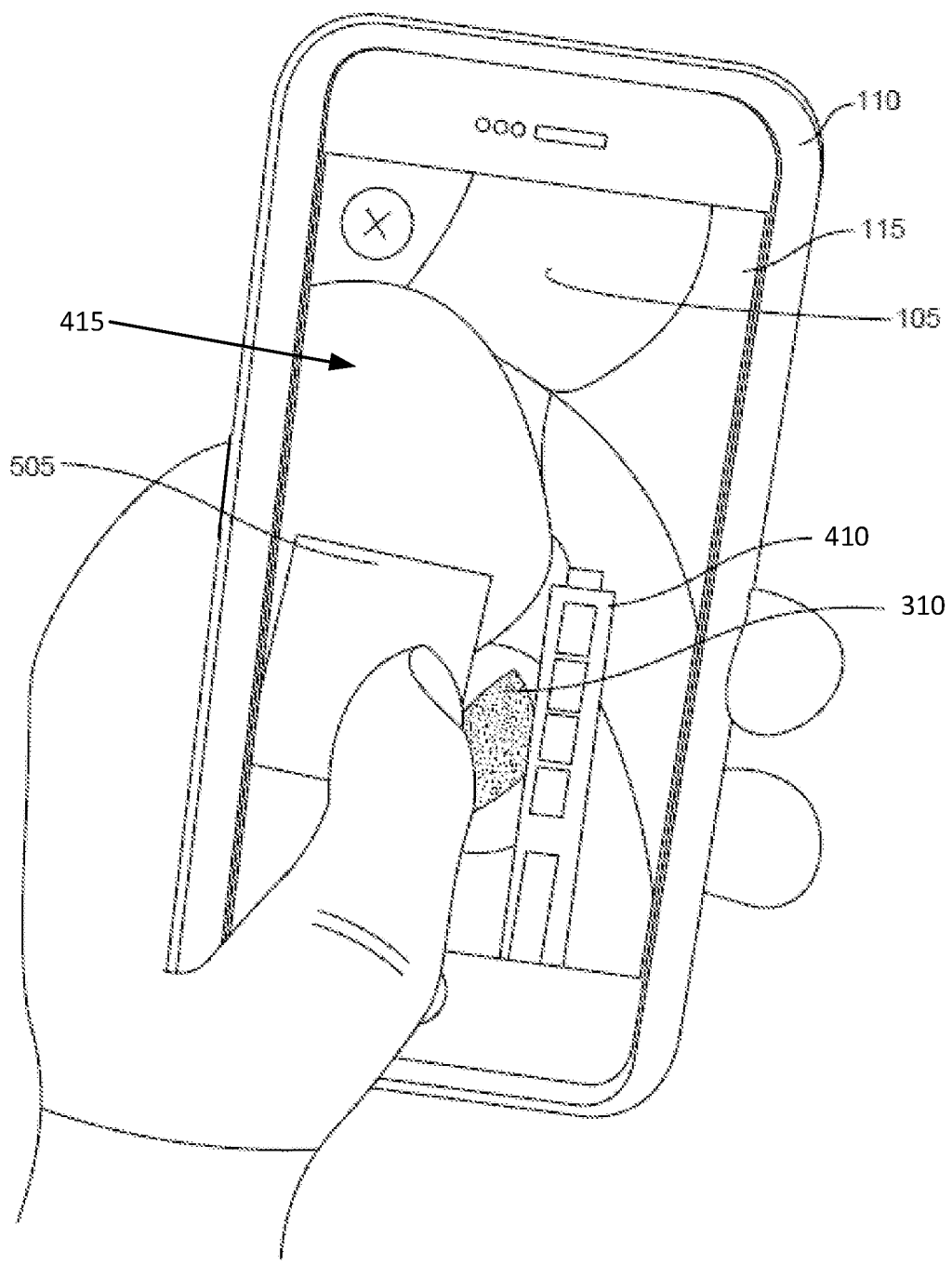

As shown in FIG. 5, a digital virtual rubbing alcohol swab 505 can be presented to the user patient through the touch-sensitive display screen 115. The user patient can touch and move the digital virtual rubbing alcohol swab 505 over to a tip of the digital virtual insulin pen 410 to clean it.

More specifically, the one or more digital virtual medical tools can include a digital virtual rubbing alcohol swab 505. The digital virtual medical tools logic section 140 can display or cause to be displayed the digital virtual rubbing alcohol swab 505 superimposed over the still frame 415. The digital virtual medical tools logic section 140 can receive one or more touch and move gestures from the user patient via the touch-sensitive display screen 115 to cause the digital virtual rubbing alcohol swab 505 to clean a tip of the digital virtual insulin pen 410.

Figure 6:
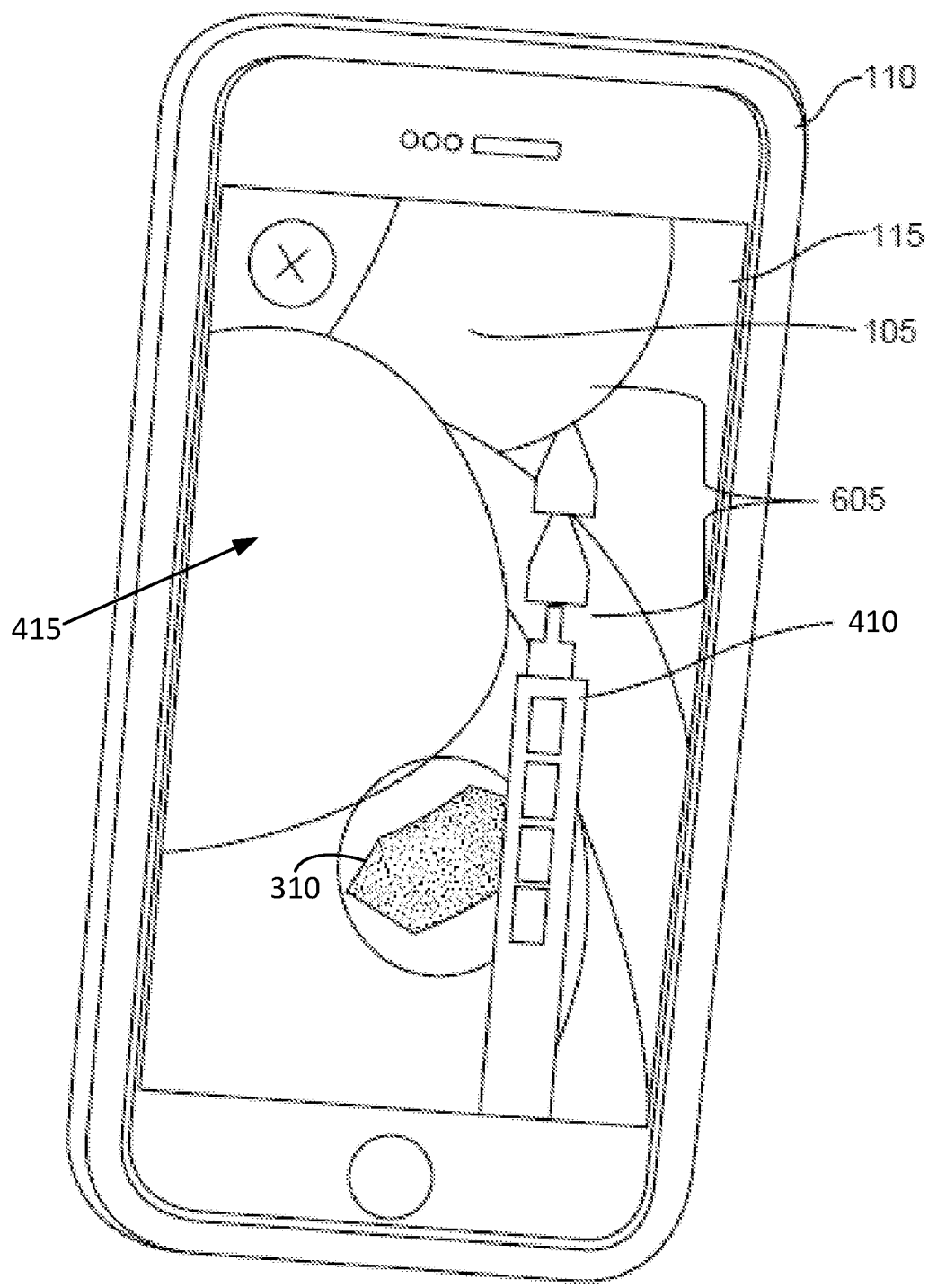

As shown in FIG. 6, the user patient can add a digital virtual needle 605 to an end of the digital virtual insulin pen 410. More specifically, the one or more digital virtual medical tools can include a digital virtual needle 605. The digital virtual medical tools logic section 140 can display or cause to be displayed the digital virtual needle 605 superimposed over the still frame 415. The digital virtual medical tools logic section 140 can receive one or more touch and move gestures from the user patient via the touch-sensitive display screen 115 to cause the digital virtual needle 605 to be attached to an end of the digital virtual insulin pen 410.

Figure 7:
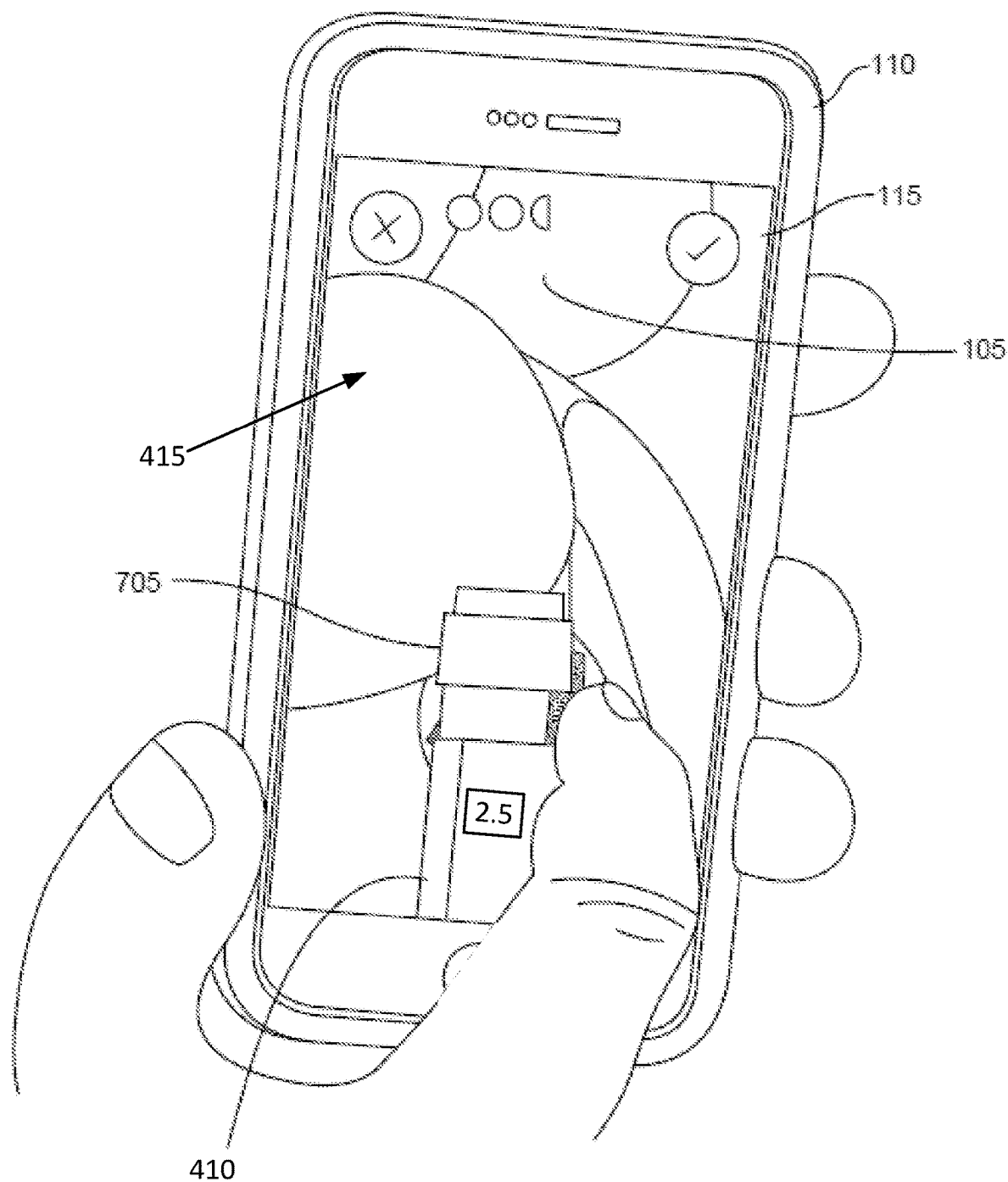

As shown in FIG. 7, the user patient can dial a dosage using a digital virtual dial 705. More specifically, the one or more digital virtual medical tools includes a digital virtual dial 705. The digital virtual medical tools logic section 140 can display or cause to be displayed the digital virtual dial 705 superimposed over the still frame 415. The digital virtual medical tools logic section 140 can receive one or more dial gestures from the user patient via the touch-sensitive display screen 115 to cause the digital virtual dial 705 to show a digital virtual dosage (e.g., 2.5) of digital virtual insulin.

Figure 8:
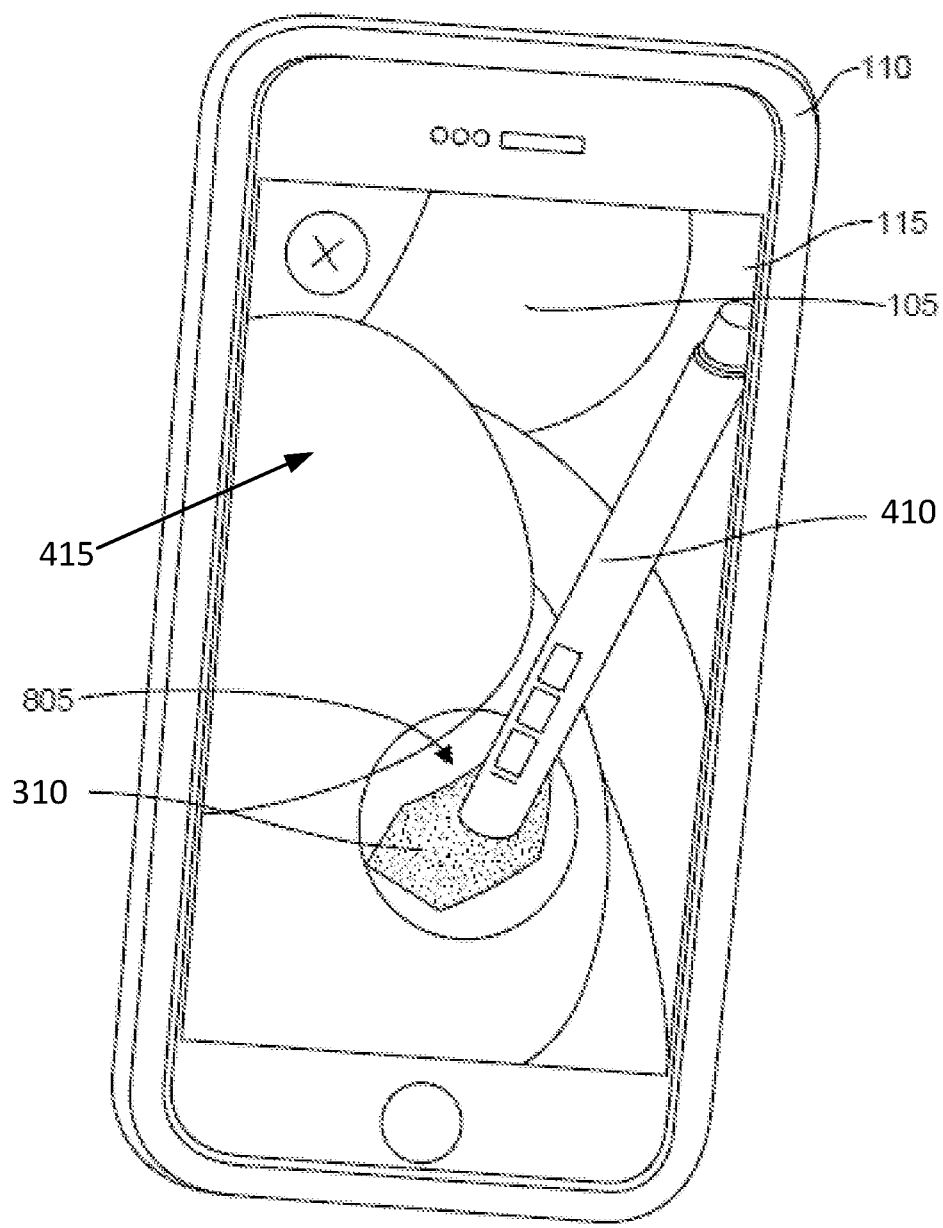

Referring to FIG. 8, the digital virtual medical tools logic section 140 can receive one or more gestures from the user patient via the touch-sensitive display screen 115 to cause the digital virtual insulin to be administered to the plush toy 105. For example, the user patient can administer the digital virtual insulin as shown at 805 in the area of the particular patch 310. The digital virtual medical tools logic section 140 of the interactive medical procedure simulation logic section 130 can cause the virtual medical care to be visually and virtually administered to the body of the plush toy 105 in the one or more corresponding locations that are each associated with the area of the body of the plush toy 105 that is comparable to the area of the human body.

The steps illustrated in FIGS. 4 through 8 include procedural steps that a child having diabetes would eventually need to learn to do on their own. The disease-care simulation teaches the child the important medical tools and steps to maintain their own health.

Figure 9:
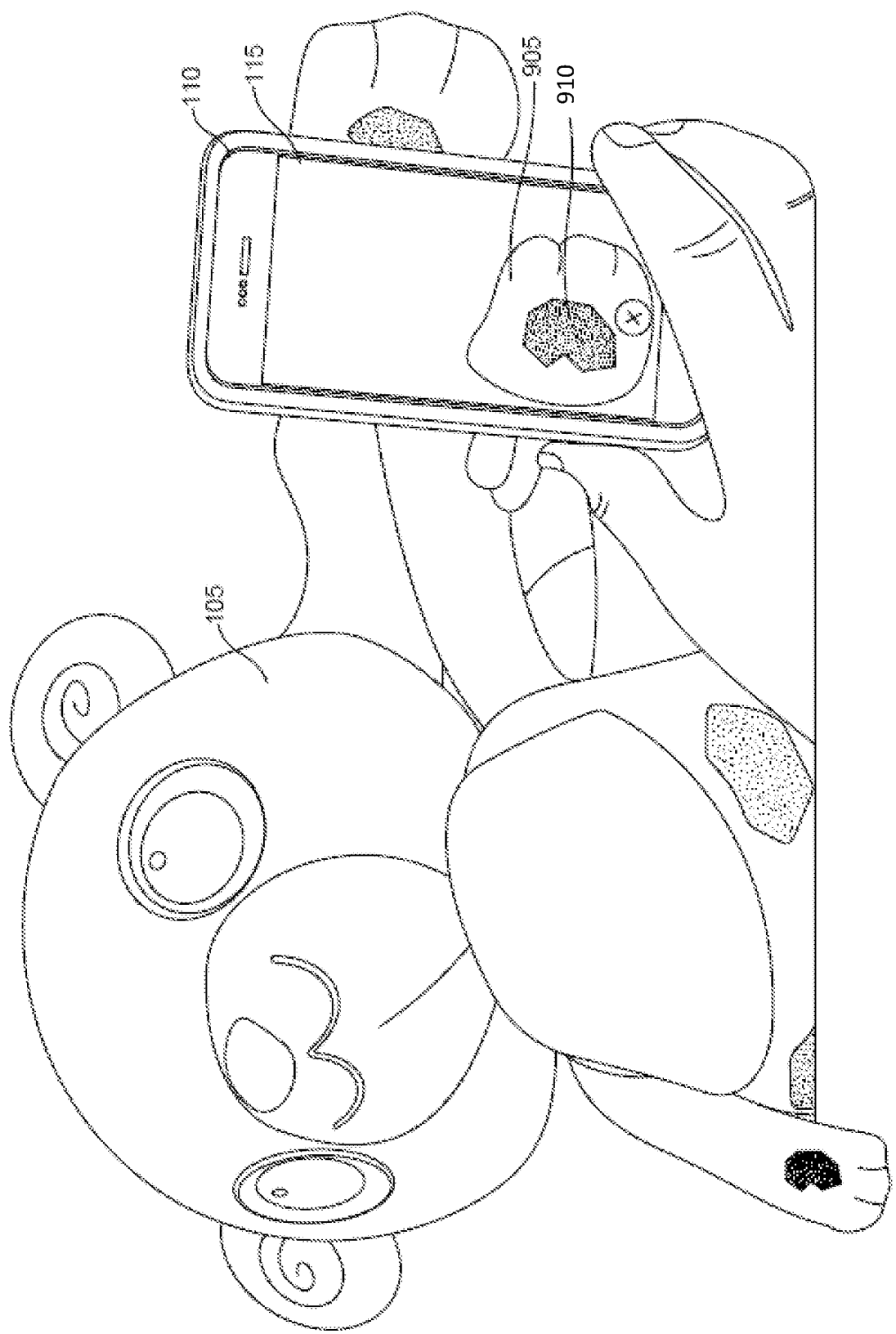
Figure 10:
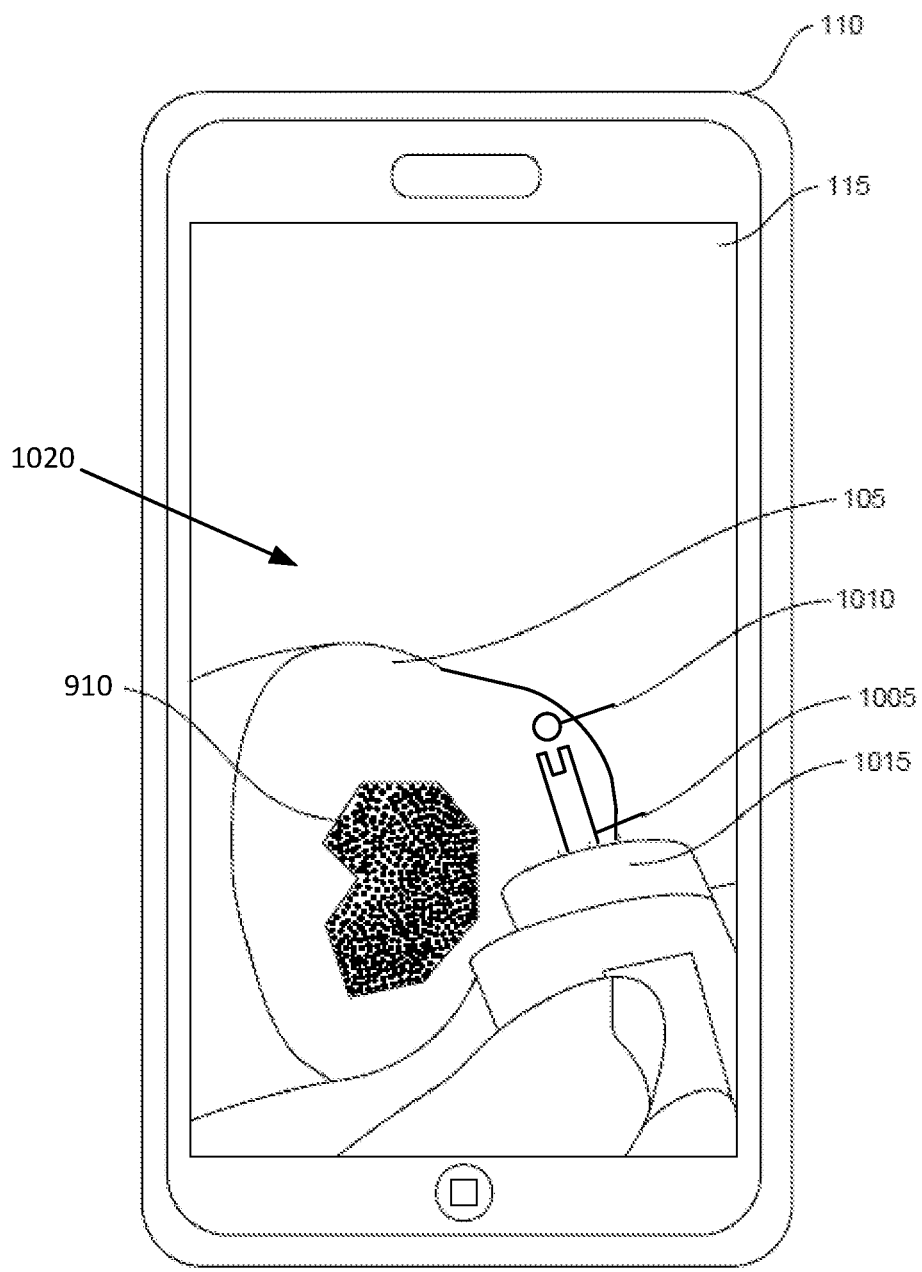
Figure 11:
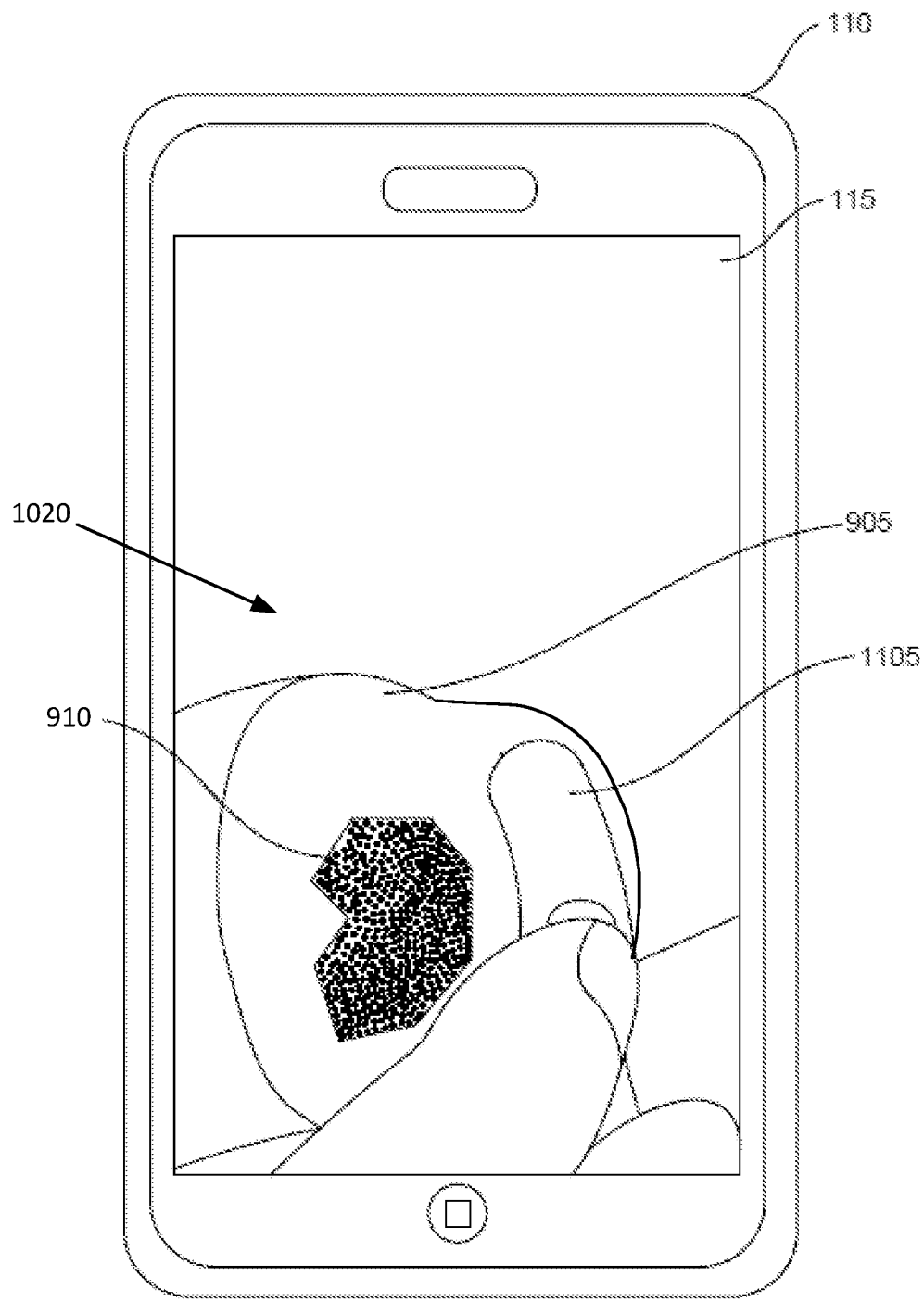

After the digital virtual insulin is administered to the plush toy 105, the interactive medical procedure simulation logic section 130 can continue the simulation in that the virtual blood sugar level of the plush toy 105 begins to drop. The scanning mode can then be selected on the mobile device 110, and another scan can be taken of a uniquely identifiable patch 125 located, for example, on a hand 905 of the plush toy 105, as shown in FIG. 9, because children check their blood sugar level in real life by pricking their own fingers. After scanning the particular patch 910 on the plush toy's hand 905, the interactive medical procedure simulation logic section 130 can present a digital virtual glucometer 1015 and a digital virtual strip 1005 over a second still frame 1020, as shown in FIG. 10. The user patient can be provided with the ability to drag the digital virtual strip 1005 to the digital virtual glucometer 1015. The digital virtual glucometer 1015 and digital virtual strip 1005 can be used to test digital virtual blood 1010 made available by a virtual prick of a digital virtual lancing device 1105 as shown in FIG. 11. The digital virtual lancing device 1105 may cause the digital virtual prick and associated digital virtual blood 1010 to appear in an area that resembles or that is similar to a position of a finger, as if the plush toy 105 was an actual human.

Figure 12:
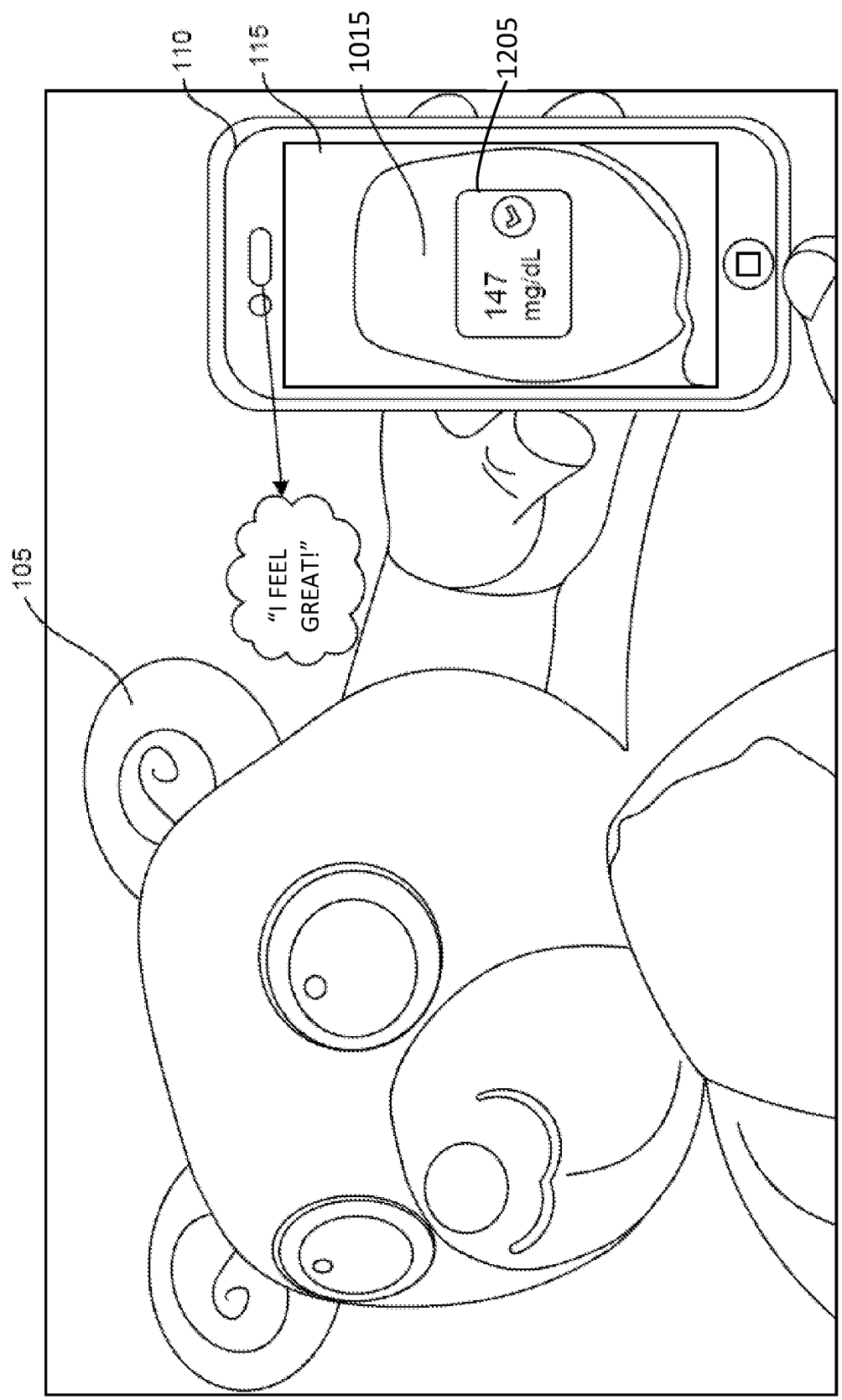

As shown in FIG. 12, the digital virtual blood sugar level (e.g., 147 mg/dL) of the plush toy 105 can be displayed on a digital virtual display 1205 on the digital virtual glucometer 1015. In this example, the virtual blood sugar level is 147 mg/dL, although it will be understood that any suitable blood sugar level can be shown for educational purposes. An audible sound from the speaker 165 of the mobile device 110 can express a confirmatory type message such as "I feel great," as if it were coming from the voice of the plush toy 105 itself. The interactive medical procedure simulation logic section 130 can cause the virtual blood sugar level to gradually drop over time.

Accordingly, after waiting a few minutes, the virtual blood sugar level can be retested, and shown to be lower than it was before. If more digital virtual insulin was administered without a corresponding amount of digital virtual food, the plush toy 105 can start to speak his symptoms. For example, the interactive medical procedure simulation logic section 130 can cause the mobile device to make sounds as if the plush toy 105 was itself talking, sharing its symptoms of shakiness, dizziness, or confusion, for example. Thus, the child can be educated about symptoms of their own chronic illness. This is achieved by presenting digital virtual disease-care tools with augmented reality by scanning the patches 125 on the activatable areas on the plush toy's body.

Put differently, the interactive medical procedure simulation logic section 130 can include a pediatric disease simulation feedback logic section 145, which can provide audio or visual feedback to the user patient associated with the virtual medical care provided to the body of the plush toy 105. The mobile device 110 can include a speaker 165. The pediatric disease simulation feedback logic section 145 can cause the speaker 165 of the mobile device 110 to provide the audio feedback to the user patient associated with the virtual medical care provided to the body of the plush toy 105. For example, the pediatric disease simulation feedback logic section 145 can cause the speaker 165 of the mobile device 110 to emit an audible confirmatory message as if it were coming from the plush toy 105. Alternatively or in addition, the pediatric disease simulation feedback logic section 145 can cause the display screen 115 of the mobile device 110 to provide the visual feedback to the user patient associated with the virtual medical care provided to the body of the plush toy 105.

More specifically, the series of live images 185 (of FIG. 1B) may be referred to as a first series of live images. The particular patch 310 (of FIG. 3) may be referred to as a first particular patch. The medical procedure described above may be referred to as a first medical procedure. The still frame 415 may be referred to as a first still frame. The visible light camera 120 of the mobile device 110 can capture a second series of live images 195 (of FIG. 1B) of the plush toy 105 including the one or more patches 125. The mobile device 110 can display the second series of live images 195 on the display screen 115 of the mobile device. The interactive medical procedure simulation logic section 130 can cause a second particular patch 910 from among the one or more patches 125 within the second series of live images 195 to be scanned, and can initiate an interactive augmented reality experience to simulate a second medical procedure for pediatric disease education responsive to the scanned second particular patch 910. In this example, the second particular patch 910 may be located on a paw or hand of the plush toy 105. A second still frame 1020 can be captured and presented on the display screen 115 responsive to the scanning of the second particular patch 910.

The one or more digital virtual medical tools can include a digital virtual lancing device 1105, a digital virtual strip 1005, and a digital virtual glucometer 1015. The digital virtual medical tools logic section 140 can cause at least one of the digital virtual lancing device 1105, the digital virtual strip 1005, or the digital virtual glucometer 1015 to be displayed superimposed over the second still frame 1020. The digital virtual medical tools logic section 140 can receive one or more touch and move gestures from the user patient via the touch-sensitive display screen 115 to cause the digital virtual lancing device 1105 to create a digital virtual prick to the plush toy 105, and can cause corresponding digital virtual blood 1010 to appear in an area that resembles a finger of the plush toy 105. The digital virtual medical tools logic section 140 can receive one or more touch and move gestures from the user patient via the touch-sensitive display screen 115 to cause the digital virtual strip 1005 to come into contact with the digital virtual blood 1010, and can cause the digital virtual glucometer 1015 to measure a digital virtual blood sugar level of the plush toy 105.

The digital virtual glucometer 1015 can include a digital virtual display 1205. The digital virtual glucometer 1015 can display on the digital virtual display 1205 the digital virtual blood sugar level (e.g., 147 mg/dL).

Figure 13:
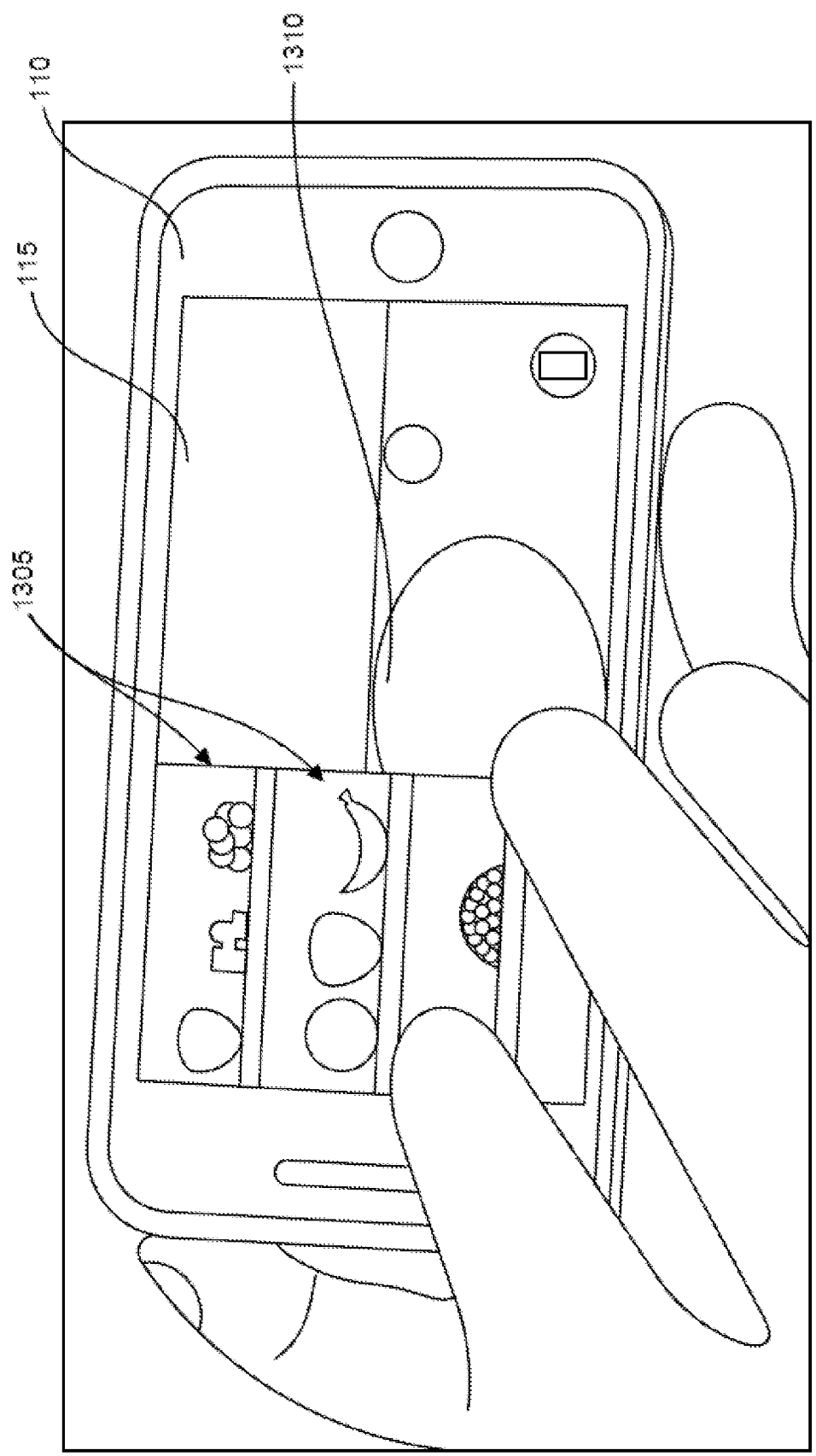
Figure 14:
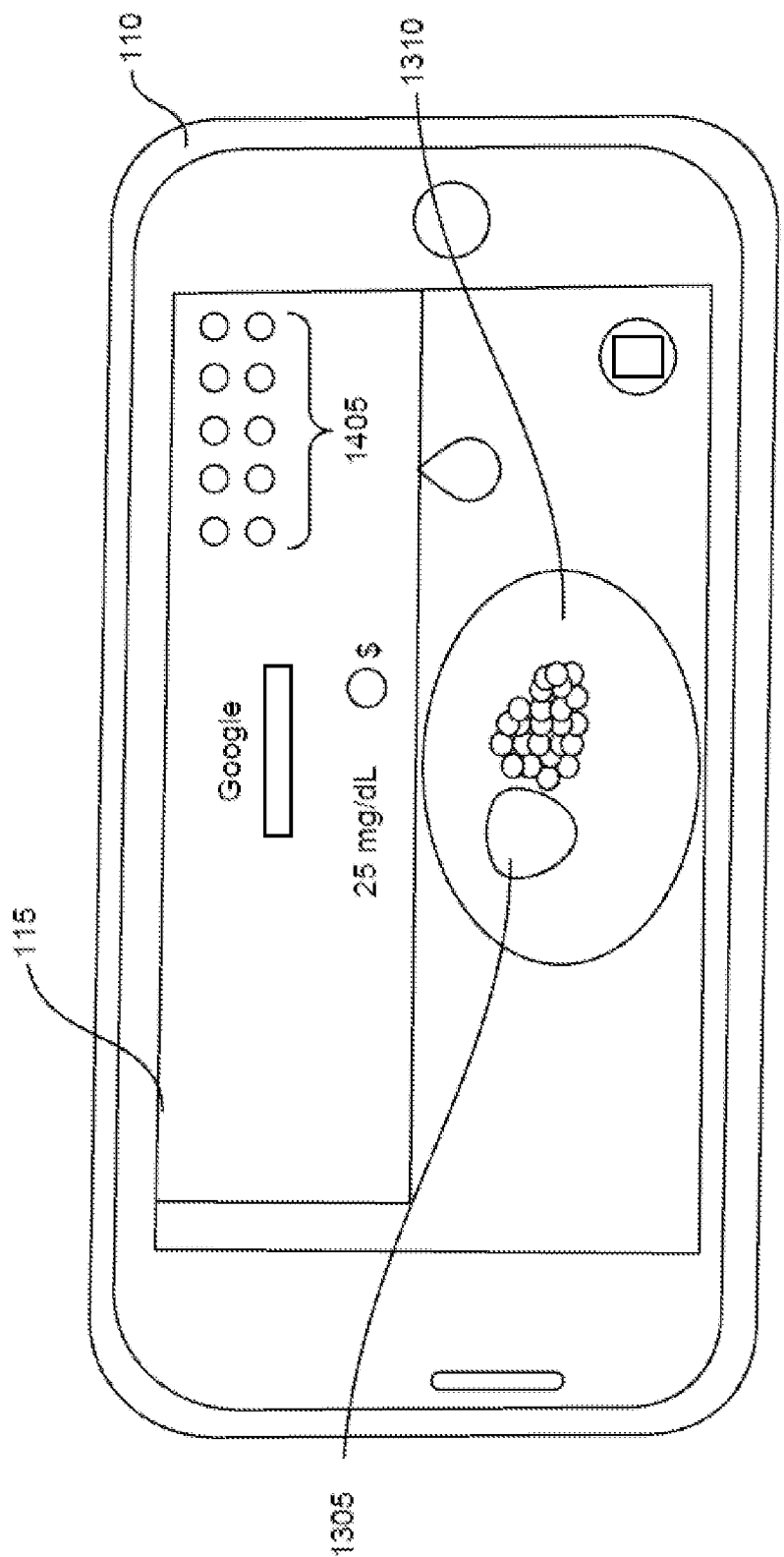

As shown in FIG. 13, the plush toy 105 can be virtually fed with digital virtual food 1305. Food choices are often a crucial part of caring for a chronic illness, such as for Type I diabetes, food allergies, obesity, or the like. Feeding the plush toy 105 with digital virtual food teaches the child what foods are appropriate, and how they impact or help their own body. The interactive medical procedure simulation logic section 130 can provide the ability for the user patient to move or drag particular digital virtual food items 1305 onto a digital virtual plate 1310. While building the plate of food 1310, as shown in FIG. 14, a digital representation of the number of carbohydrates 1405 can be displayed on the mobile device 110. For example, the number of carbohydrates 1405 can be represented by a grouping of icons, with each icon representing a portion of the total number of carbohydrates 1405. When the user patient drags certain of the digital virtual food items 1310 off of the plate, the digital representation of the number of carbohydrates 1405 can be automatically adjusted, i.e., increased or decreased.

Figure 15:
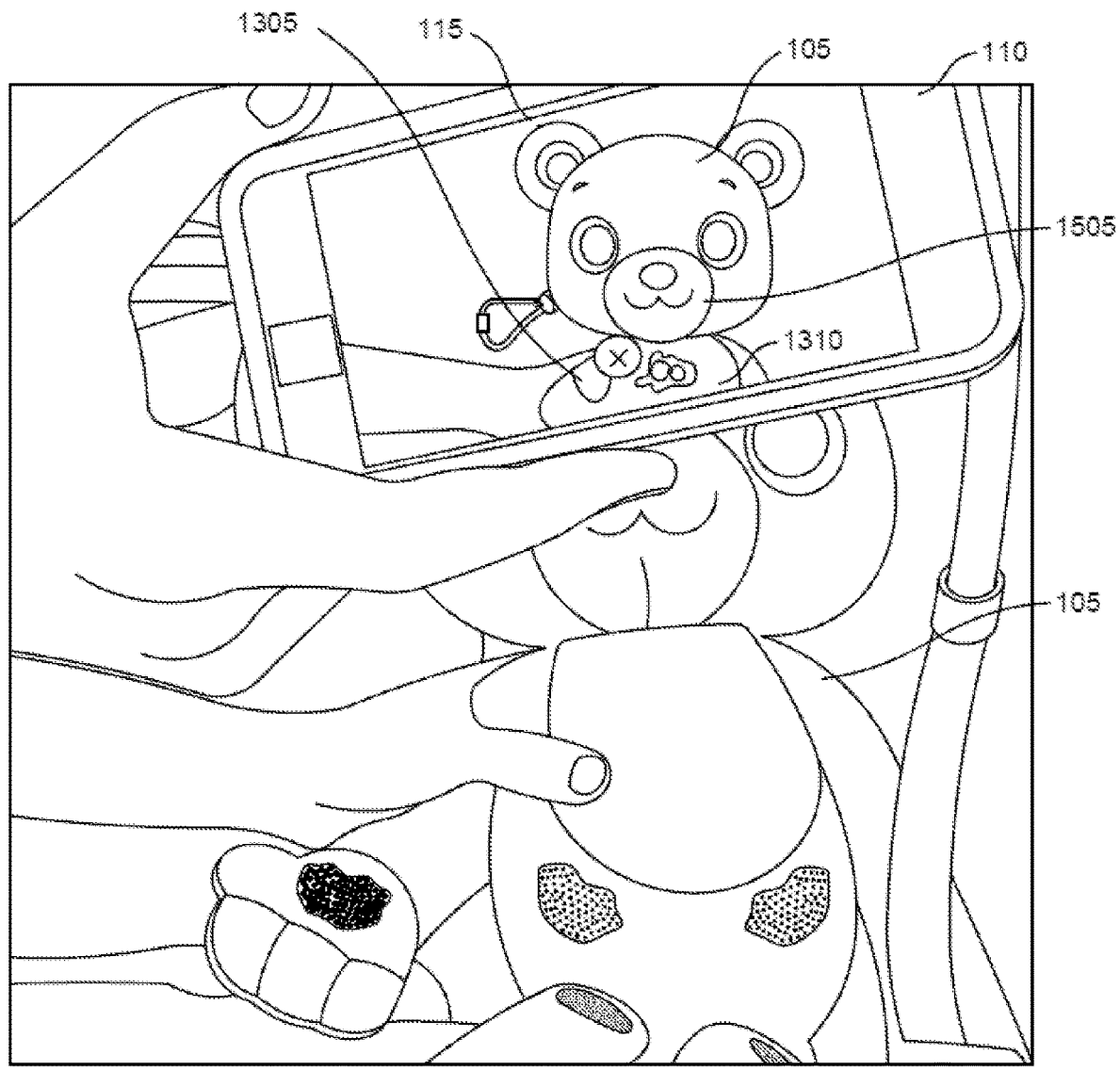

As shown in FIG. 15, the digital virtual plate 1310 of digital virtual food items 1305 can then be moved to toward a mouth 1505 of the plush toy 105 in the augmented reality combination of the actual image of the plush toy 105 combined with the digital virtual items (e.g., 1305 and 1310). In this manner, the plush toy 105 can be virtually fed with the selected digital virtual food items 1305.

More specifically, the interactive medical procedure simulation logic section 130 can include a pediatric disease simulation feedback logic section 145, which can cause the speaker 165 of the mobile device 110 to emit a message as if it were coming from the plush toy 105 regarding at least one symptom of shakiness, dizziness, or confusion. The interactive medical procedure simulation logic section 130 can include a digital virtual food logic section 180, which can cause digital virtual food 1305 and a digital virtual plate 1310 to be displayed on the touch-sensitive display screen 115. The digital virtual food logic section 180 can receive one or more touch and move gestures from the user patient via the touch-sensitive display screen 115 to cause a selection of the digital virtual food 1305 to be moved onto the digital virtual plate 1310. The digital virtual food logic section 180 can receive one or more touch and move gestures from the user patient via the touch-sensitive display screen 115 to cause the digital virtual plate 1310 having the digital virtual food 1305 to be moved toward a mouth 1505 of the plush toy 105 to virtually feed the plush toy 105 with the selection of the digital virtual food 1305. The digital virtual food logic section 180 can cause a representation of a number of carbohydrates 1405 associated with the selection of the digital virtual food 1305 on the digital virtual plate 1310 to be displayed on the touch-sensitive display screen 115.

In this manner, education is provided to children with illness. Comfort and emotional support are also provided. Fun game-play and entertainment are wrapped together with useful and uplifting education. Information about the child's adherence with their medical procedures can be collected, logged, and stored. The information can be transmitted to a healthcare professional or caregiver for further analysis. The system 100 can be used by doctors, nurses, and medical staff to alleviate patient stress before a procedure.

Figure 16:
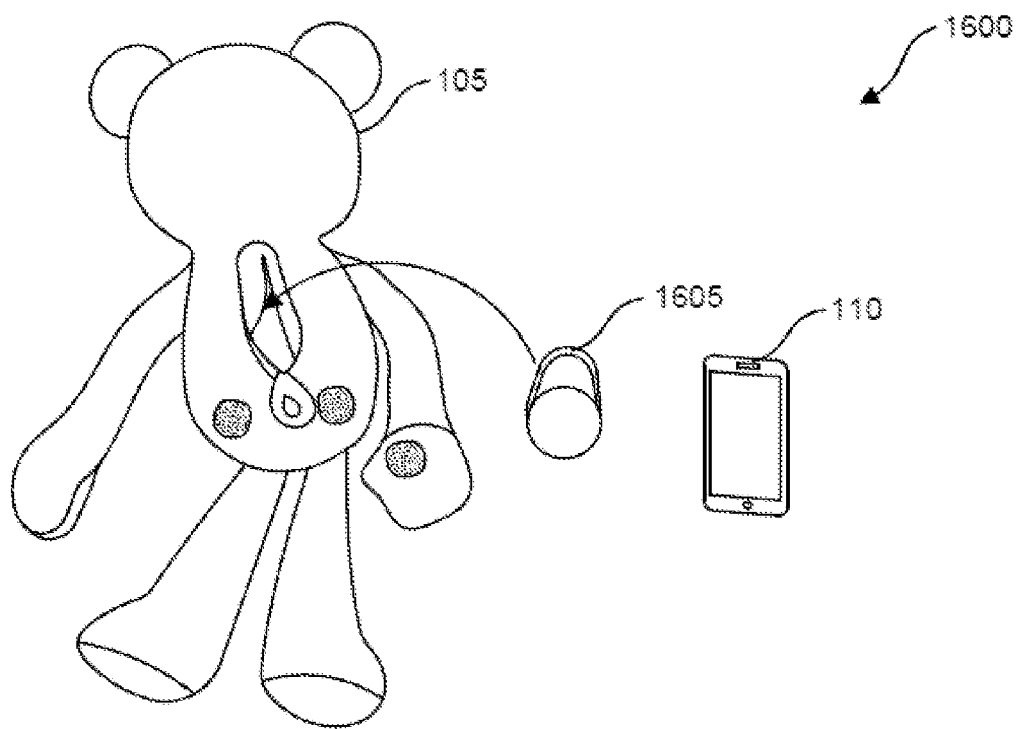
FIGS. 16 and 17 illustrate an alternative system for creating an interactive augmented reality experience to simulate medical procedures for pediatric disease education alternative embodiment of the inventive concept.
Figure 17:
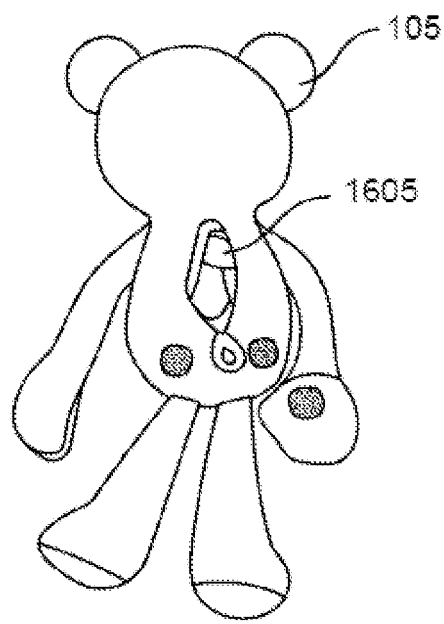

FIGS. 16 and 17 illustrate an alternative system 1600 for creating an interactive augmented reality experience to simulate medical procedures for pediatric disease education alternative embodiment of the inventive concept. In the system 1600, the plush toy 105 has a computer unit 1605 including a speaker and wireless connectivity. In this embodiment the user patient can administer virtual disease care to their plush toy 105 using their mobile device 110. Audio and visual feedback is provided to the user patient directly from the computer unit 1605 embedded in the plush toy 105 itself, and in some embodiments, from the mobile device 110 as well.

In another alternative embodiment, the interactive medical procedure simulation logic section 130 can further collect information about the child's medical condition. This information can either be collected through direct user input, optical character recognition, wireless communication with a medical device, or questions that the interactive medical procedure simulation logic section 130 asks the user patient. In this embodiment, the medical information can be stored for later transmission to doctors and caregivers.

In another alternative embodiment, user patients can practice performing medical procedures on themselves. The interactive medical procedure simulation logic section 130 can recognize the user patient's body parts either through object recognition, or through temporary tattoos that the user patient places on their body. The user patient can then use the aforementioned process to practice disease care on themselves using the digital virtual disease care tools within the augmented reality experience using the system 100 or 1600 described above.

In another alternative embodiment, the process described can be used to educate children about standard medical procedures that they may encounter during a checkup or an acute medical condition such as a broken bone. In this embodiment, the plush toy 105 may be used by a doctor to demonstrate a procedure, such as removing a cast, in order to alleviate patient stress.

In an alternate embodiment, the toy may come with physical accessories such as a real-life glucometer, insulin pen, thermometer, inhaler, or the like. When these physical, non-virtual, accessories are viewed using the mobile device, they can come to life with additional information. For example, a user patient can look at the physical non-electronic glucometer using the display of the mobile phone to see their plush toy's blood sugar level. In other words, the information about the blood sugar level (or other medical information suitable for the physical tool being viewed) can be displayed on the display of the mobile device.

Figure 18:
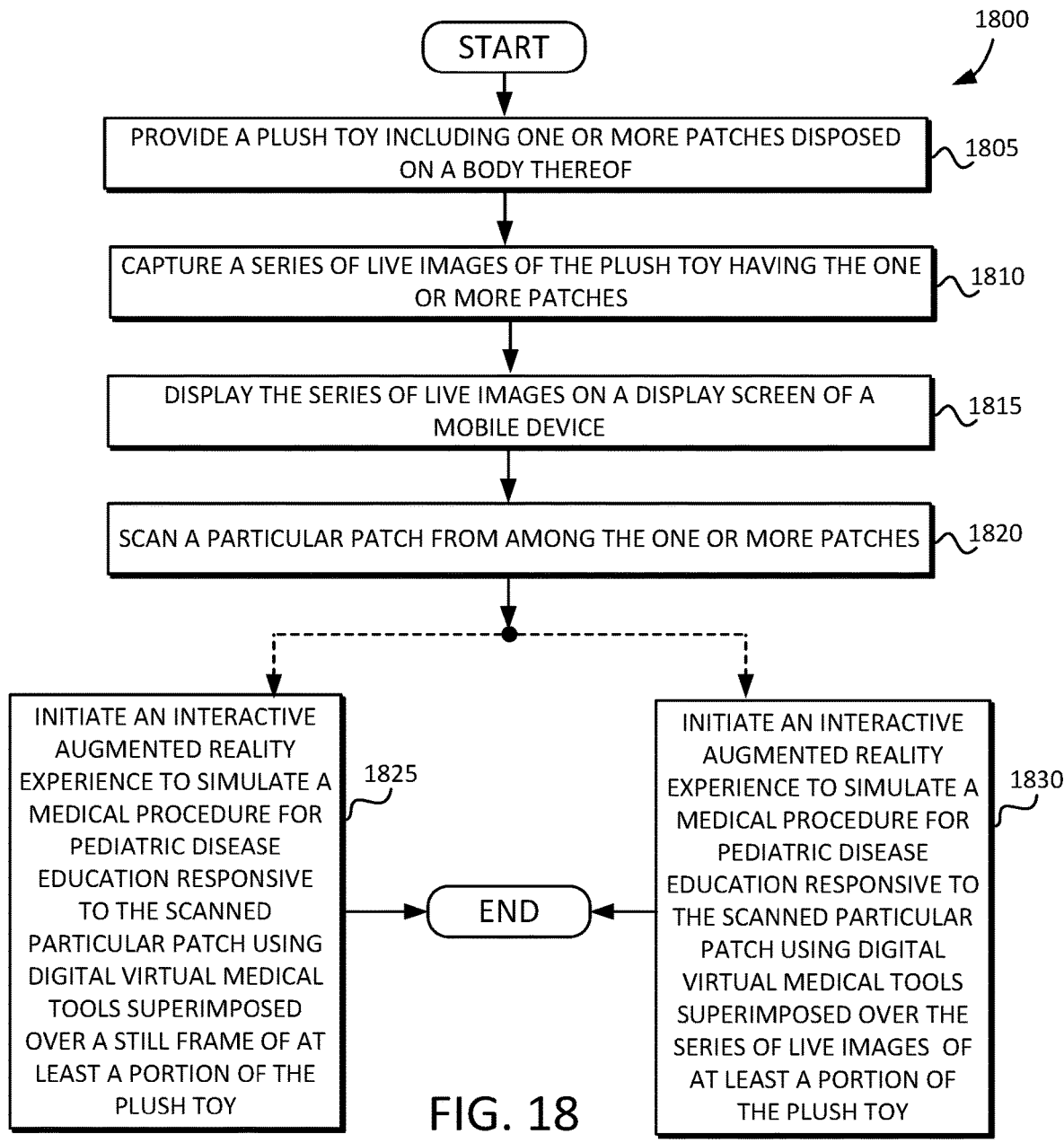
FIG. 18 is a flow diagram illustrating a technique for initiating an interactive augmented reality experience to simulate a medical procedure for pediatric disease education.

FIG. 18 is a flow diagram 1800 illustrating a technique for initiating an interactive augmented reality experience to simulate a medical procedure for pediatric disease education. At 1805, a plush toy can be provided having one or more patches disposed on a body thereof. At 1810, a series of live images can be captured of the plush toy having the one or more patches. At 1815, the series of live images can be displayed on a display screen of a mobile device. At 1820, a particular patch from among the one more patches can be scanned by the mobile device. After 1820, one of two alternate approaches can be taken through 1825 or 1830. At 1825, an interactive augmented reality experience can be initiated to simulate a medical procedure for pediatric disease education responsive to the scanned particular patch using digital virtual medical tools superimposed over a still frame of at least a portion of the plush toy which contains the particular patch. Alternatively, at 1830, an interactive augmented reality experience can be initiated to simulate a medical procedure for pediatric disease education responsive to the scanned particular patch using digital virtual medical tools superimposed over the series of live images of at least a portion of the plush toy. In some embodiments, the digital virtual medical tools are "anchored" to the scanned patch. In other words, the digital virtual medical tools may be superimposed in the area near the scanned patch, so they appear "fixed" in space relative to the particular patch of the plush while the live images from the camera feed might move around, enhancing the apparent reality of the situation. In some embodiments, the plush toy exists in a virtual reality or augmented reality, or an alternate reality.

While examples of digital virtual medical tools provided above relate to treatment of diabetes, it will be understood that the concepts disclosed herein can relate to other medical procedures, and include other digital virtual medical tools. By way of another example, a digital virtual inhaler can be provided as one of the digital virtual medical tools, and manipulated by the patient user superimposed over a still frame or live feed of the plush toy to provide virtual oxygen and/or inhalant to the plush toy for treatment education pertaining asthma. By way of yet another example, a digital virtual nebulizer can be provided as one of the digital virtual medical tools, and manipulated by the patient user superimposed over a still frame or live feed of the plush toy for treatment education pertaining asthma. By way of still another example, a digital virtual blood pressure monitor can be provided as one of the digital virtual medical tools, and manipulated by the patient user superimposed over a still frame or live feed of the plush toy to measure the plush toy's virtual blood pressure. By way of still another example, a digital virtual thermometer can be provided as one of the digital virtual medical tools, and manipulated by the patient user superimposed over a still frame or live feed of the plush toy to measure the plush toy's virtual body temperature. By way of another example, a digital virtual X-ray machine can be provided as one of the digital virtual medical tools, and manipulated by the patient user superimposed over a still frame or live feed of the plush toy to take a digital virtual X-ray image of the plush toy's body.

Figure 19:
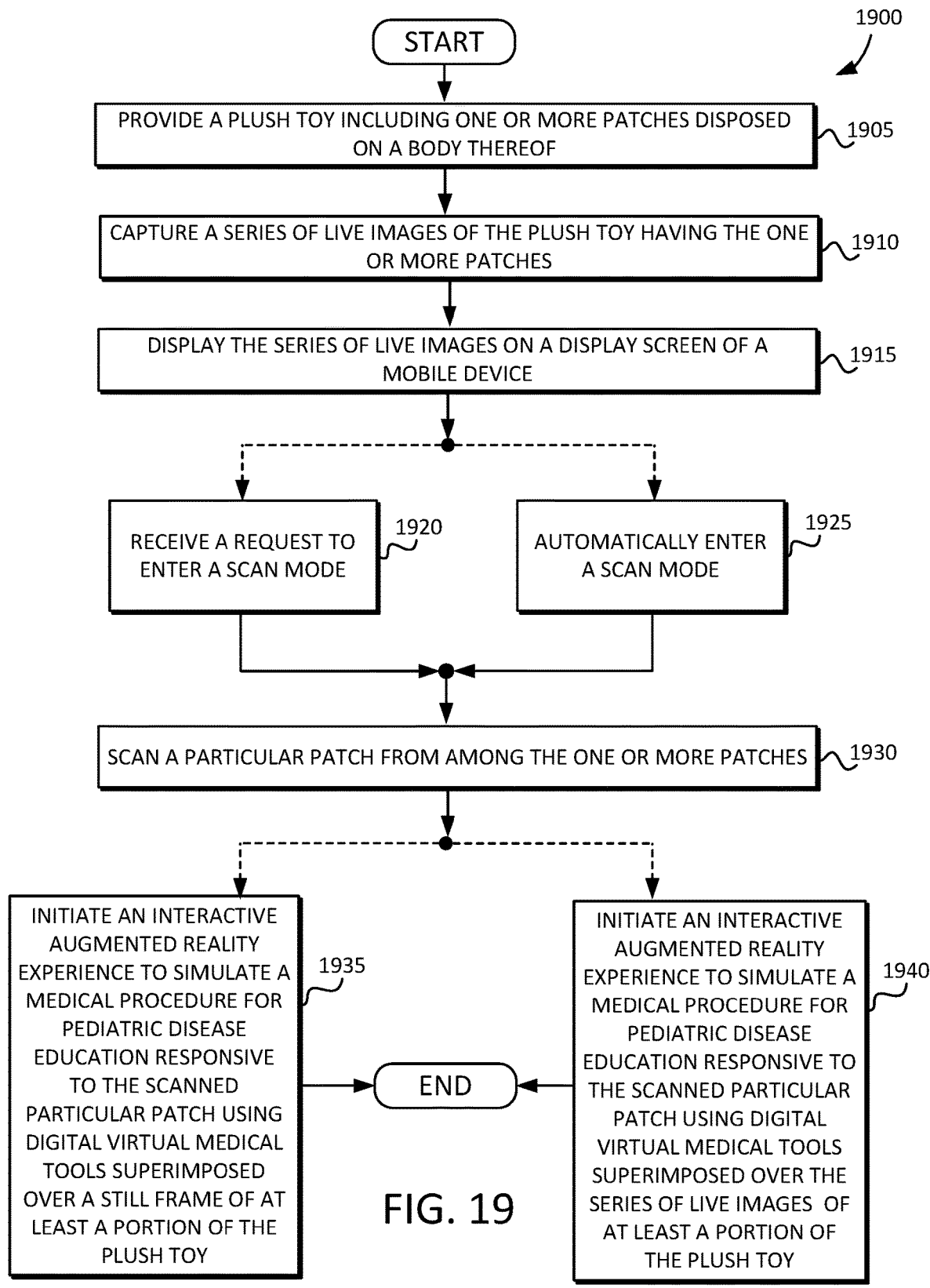
FIG. 19 is a flow diagram illustrating another technique for initiating an interactive augmented reality experience to simulate a medical procedure for pediatric disease education.

FIG. 19 is a flow diagram 1900 illustrating another technique for initiating an interactive augmented reality experience to simulate a medical procedure for pediatric disease education. At 1905, a plush toy can be provided having one or more patches disposed on a body thereof. At 1910, a series of live images can be captured of the plush toy having the one or more patches. At 1915, the series of live images can be displayed on a display screen of a mobile device.

After 1915, one of two paths can be taken through 1920 or 1925. At 1920, a request to scan or to enter a scan mode can be received. Alternatively, at 1925, a scan mode can be automatically entered. At 1930, a particular patch from among the one more patches can be scanned by the mobile device. After 1930, one of two alternate approaches can be taken through 1935 or 1940. At 1935, an interactive augmented reality experience can be initiated to simulate a medical procedure for pediatric disease education responsive to the scanned particular patch using digital virtual medical tools superimposed over a still frame of at least a portion of the plush toy which contains the particular patch. Alternatively, at 1940, an interactive augmented reality experience can be initiated to simulate a medical procedure for pediatric disease education responsive to the scanned particular patch using digital virtual medical tools superimposed over the series of live images of at least a portion of the plush toy. In some embodiments, the digital virtual medical tools are "anchored" to the scanned patch. In other words, the digital virtual medical tools may be superimposed in the area near the scanned patch, so they appear "fixed" in space relative to the particular patch of the plush while the live images from the camera feed might move around, to enhancing the apparent reality of the situation. In some embodiments, the plush toy exists in a virtual reality or augmented reality, or an alternate reality.

Referring to FIG. 19, while examples of digital virtual medical tools provided above relate to treatment of diabetes, it will be understood that the concepts disclosed herein can relate to other medical procedures, and include other digital virtual medical tools. By way of another example, a digital virtual inhaler can be provided as one of the digital virtual medical tools, and manipulated by the patient user superimposed over a still frame or live feed of the plush toy to provide virtual oxygen and/or inhalant to the plush toy for treatment education pertaining asthma. By way of yet another example, a digital virtual nebulizer can be provided as one of the digital virtual medical tools, and manipulated by the patient user superimposed over a still frame or live feed of the plush toy for treatment education pertaining asthma. By way of still another example, a digital virtual blood pressure monitor can be provided as one of the digital virtual medical tools, and manipulated by the patient user superimposed over a still frame or live feed of the plush toy to measure the plush toy's virtual blood pressure. By way of still another example, a digital virtual thermometer can be provided as one of the digital virtual medical tools, and manipulated by the patient user superimposed over a still frame or live feed of the plush toy to measure the plush toy's virtual body temperature. By way of another example, a digital virtual X-ray machine can be provided as one of the digital virtual medical tools, and manipulated by the patient user superimposed over a still frame or live feed of the plush toy to take a digital virtual X-ray image of the plush toy's body.

Figure 20:
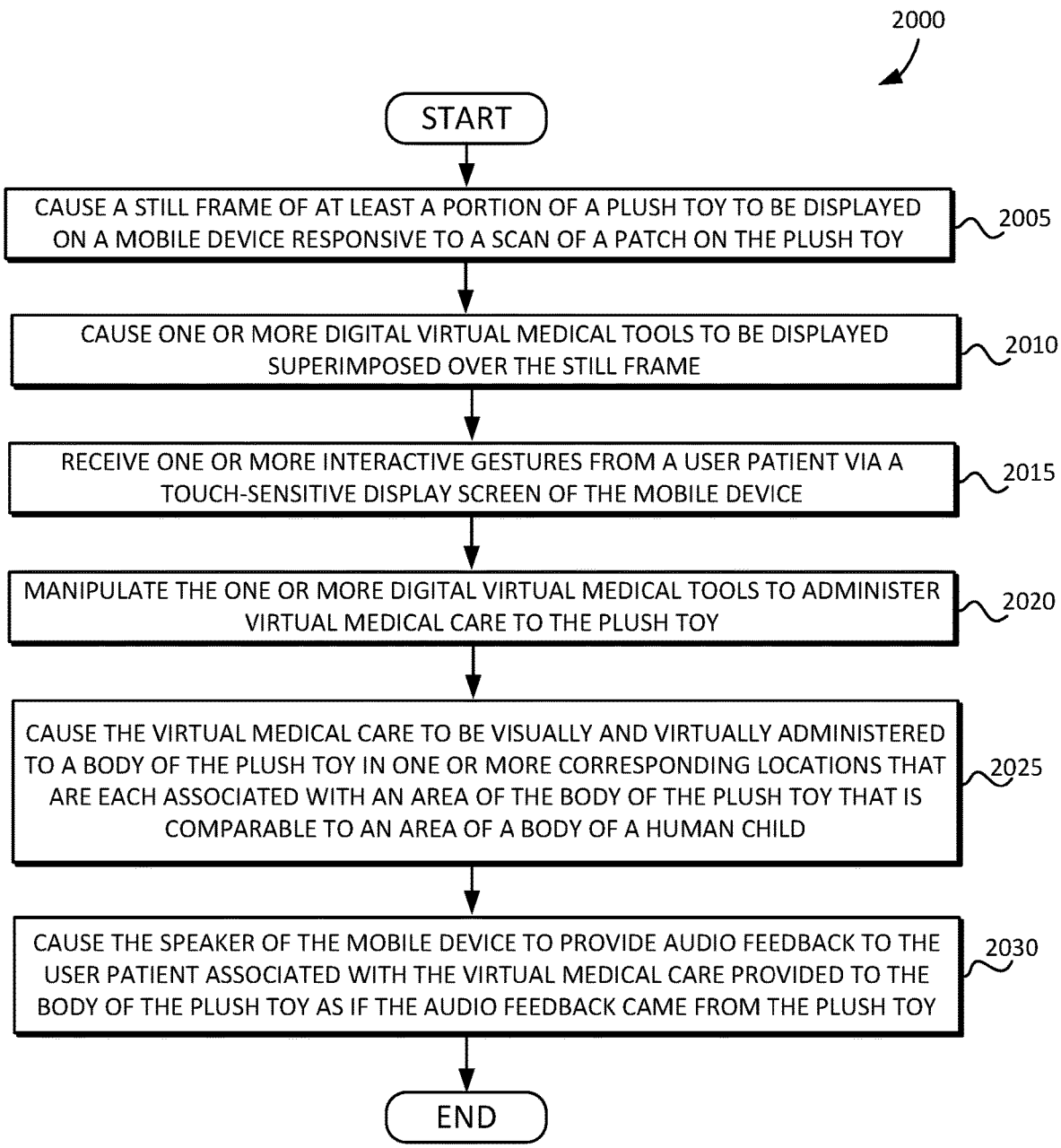
FIG. 20 is a flow diagram illustrating a technique for creating an interactive augmented reality experience to simulate a medical procedure for pediatric disease education.

FIG. 20 is a flow diagram illustrating a technique for creating an interactive augmented reality experience to simulate a medical procedure for pediatric disease education. At 2005, a still frame of at least a portion of the plush toy can be caused to be displayed on a mobile device responsive to a scan of a patch on the plush toy. At 2010, one or more digital virtual medical tools can be caused to be displayed superimposed over the still frame. At 2015, one or more interactive gestures can be received from a user patient via a touch-sensitive display screen of the mobile device. At 2020, the one or more digital medical tools can be manipulated to administered virtual medical care to the plush toy. At 2025, the virtual medical care can be caused to be visually and virtually administered to a body of the plush toy in one or more corresponding locations that are each associated with an area of the body of the plush toy that is comparable to an area of the human body. At 2030, the speaker of the mobile device can be caused to provide audio feedback to the user patient associated with the virtual medical care provided to the body of the plush toy as if the audio feedback came from the plush toy itself.

Referring to FIG. 20, while examples of digital virtual medical tools provided above relate to treatment of diabetes, it will be understood that the concepts disclosed herein can relate to other medical procedures, and include other digital virtual medical tools. By way of another example, a digital virtual inhaler can be provided as one of the digital virtual medical tools, and manipulated by the patient user superimposed over a still frame or live feed of the plush toy to provide virtual oxygen and/or inhalant to the plush toy for treatment education pertaining asthma. By way of yet another example, a digital virtual nebulizer can be provided as one of the digital virtual medical tools, and manipulated by the patient user superimposed over a still frame or live feed of the plush toy for treatment education pertaining asthma. By way of still another example, a digital virtual blood pressure monitor can be provided as one of the digital virtual medical tools, and manipulated by the patient user superimposed over a still frame or live feed of the plush toy to measure the plush toy's virtual blood pressure. By way of still another example, a digital virtual thermometer can be provided as one of the digital virtual medical tools, and manipulated by the patient user superimposed over a still frame or live feed of the plush toy to measure the plush toy's virtual body temperature. By way of another example, a digital virtual X-ray machine can be provided as one of the digital virtual medical tools, and manipulated by the patient user superimposed over a still frame or live feed of the plush toy to take a digital virtual X-ray image of the plush toy's body.

More specifically, a method can include causing, by the pediatric disease simulation feedback logic section of the interactive medical procedure simulation logic section, the speaker of the mobile device to provide the audio feedback to the user patient associated with the virtual medical care provided to the body of the plush toy. The method may include causing, by the pediatric disease simulation feedback logic section of the interactive medical procedure simulation logic section, the display screen of the mobile device to provide the visual feedback to the user patient associated with the virtual medical care provided to the body of the plush toy.

A method can include causing, by the digital virtual medical tools logic section, the digital virtual insulin pen having the digital virtual cap to be displayed superimposed over the still frame. A method can include receiving, by the digital virtual medical tools logic section, one or more sliding gestures from the user patient via the touch-sensitive display screen to remove the digital virtual cap from the digital virtual insulin pen. A method can include causing, by the digital virtual medical tools logic section, the digital virtual rubbing alcohol swab to be displayed superimposed over the still frame. A method can include receiving, by the digital virtual medical tools logic section, one or more touch and move gestures from the user patient via the touch-sensitive display screen to cause the digital virtual rubbing alcohol swab to clean a tip of the digital virtual insulin pen.

A method can include causing, by the digital virtual medical tools logic section, the digital virtual needle to be displayed superimposed over the still frame. A method can include receiving, by the digital virtual medical tools logic section, one or more touch and move gestures from the user patient via the touch-sensitive display screen to cause the digital virtual needle to be attached to an end of the digital virtual insulin pen. A method can include causing, by the digital virtual medical tools logic section, the digital virtual dial to be displayed superimposed over the still frame. A method can include causing, by the digital virtual medical tools logic section, one or more dial gestures from the user patient via the touch-sensitive display screen to cause the digital virtual dial to show a digital virtual dosage of digital virtual insulin.

In some embodiments, a method includes receiving, by the digital virtual medical tools logic section, one or more gestures from the user patient via the touch-sensitive display screen to cause the digital virtual insulin to be administered to the plush toy. In some embodiments, a method includes capturing, by the visible light camera of the mobile device, a second series of live images of the plush toy including the one or more patches. In some embodiments, a method includes displaying, by the mobile device, the second series of live images on the display screen of the mobile device. In some embodiments, a method includes causing, by the interactive medical procedure simulation logic section, a second particular patch from among the one or more patches within the second series of live images to be scanned, and initiating an interactive augmented reality experience to simulate a second medical procedure for pediatric disease education responsive to the scanned second particular patch.

In some embodiments, a method includes causing, by the digital virtual medical tools logic section, at least one of the digital virtual lancing device, the digital virtual strip, or the digital virtual glucometer to be displayed superimposed over a second still frame. In some embodiments, a method includes receiving, by the digital virtual medical tools logic section, one or more touch and move gestures from the user patient via the touch-sensitive display screen to cause the digital virtual lancing device to create a digital virtual prick to the plush toy, and causing corresponding digital virtual blood to appear in an area that resembles a finger of the plush toy. In some embodiments, a method includes receiving, by the digital virtual medical tools logic section, one or more touch and move gestures from the user patient via the touch-sensitive display screen to cause the digital virtual strip to come into contact with the digital virtual blood, and causing the digital virtual glucometer to measure a digital virtual blood sugar level of the plush toy.

In some embodiments, a method includes displaying, by the digital virtual glucometer on the digital virtual display the digital virtual blood sugar level. In some embodiments, a method includes causing, by the interactive medical procedure simulation logic section of a pediatric disease simulation feedback logic section, the speaker of the mobile device to emit an audible confirmatory message as if it were coming from the plush toy.

In some embodiments, a method includes causing, by a pediatric disease simulation feedback logic section, the speaker of the mobile device to emit a message as if it were coming from the plush toy regarding at least one symptom of shakiness, dizziness, or confusion. In some embodiments, a method includes causing, by a digital virtual food logic section, digital virtual food and a digital virtual plate to be displayed on the touch-sensitive display screen. In some embodiments, a method includes receiving, by the digital virtual food logic section, one or more touch and move gestures from the user patient via the touch-sensitive display screen to cause a selection of the digital virtual food to be moved onto the digital virtual plate. In some embodiments, a method includes receiving, by the digital virtual food logic section, one or more touch and move gestures from the user patient via the touch-sensitive display screen to cause the digital virtual plate having the digital virtual food to be moved toward a mouth of the plush toy to virtually feed the plush toy with the selection of the digital virtual food.

In some embodiments, a method includes causing, by the digital virtual food logic section, a representation of a number of carbohydrates associated with the selection of the digital virtual food on the digital virtual plate to be displayed on the touch-sensitive display screen.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. An interactive augmented reality system for simulating medical procedures for pediatric disease education, the system comprising:
   a plush toy including one or more patches disposed on a body of the plush toy in one or more corresponding locations each associated with an area of the body of the plush toy that is comparable to an area of a human body; and
   an interactive medical procedure simulation logic section operable within a mobile device, wherein the mobile device includes a visible light camera configured to capture a series of live images of the plush toy having the one or more patches, and wherein the mobile device is configured to display the series of live images on a display screen of the mobile device,
   wherein:
   the interactive medical procedure simulation logic section is configured to cause a particular patch from among the one or more patches within the series of live images to be scanned, and to initiate an interactive augmented reality experience to simulate a medical procedure for pediatric disease education responsive to the scanned particular patch;
   the interactive medical procedure simulation logic section is configured to cause a still frame including the scanned particular patch and at least a portion of the body of the plush toy to be displayed on the display screen;
   the interactive medical procedure simulation logic section includes a digital virtual medical tools logic section configured to cause one or more digital virtual medical tools to be displayed superimposed over at least one of (a) the still frame or (b) the series of live images;
   the display screen is a touch-sensitive display screen; and
   the digital virtual medical tools logic section of the interactive medical procedure simulation logic section is configured to receive one or more interactive gestures from a user patient via the touch-sensitive display screen to manipulate the one or more digital virtual medical tools to administer virtual medical care to the plush toy.

2. The system of claim 1, wherein:
   the interactive medical procedure simulation logic section includes a scan handler logic section;
   the display screen is a touch-sensitive display screen; and
   the scan handler logic section of the interactive medical procedure simulation logic section is configured to receive a scan request from a user patient via the touch-sensitive display screen to scan the particular patch from among the one or more patches within the series of live images.

3. The system of claim 1, wherein the interactive medical procedure simulation logic section includes a scan handler logic section that is configured to automatically scan the particular patch from among the one or more patches within the series of live images.

4. The system of claim 1, wherein:
   the interactive medical procedure simulation logic section includes a scan handler logic section;
   the scan handler logic section of the interactive medical procedure simulation logic section is configured to recognize the scanned particular patch; and
   the scan handler logic section of the interactive medical procedure simulation logic section is configured to cause an animation to be superimposed on the series of live images of the plush toy to indicate to a user patient that the scanned particular patch has been recognized.

5. The system of claim 1, wherein the digital virtual medical tools logic section of the interactive medical procedure simulation logic section is configured to cause the virtual medical care to be visually and virtually administered to the body of the plush toy in the one or more corresponding locations that are each associated with the area of the body of the plush toy that is comparable to the area of the human body.

6. The system of claim 1, wherein the interactive medical procedure simulation logic section includes a pediatric disease simulation feedback logic section configured to provide at least one of audio or visual feedback to the user patient associated with the virtual medical care provided to the body of the plush toy.

7. The system of claim 6, wherein:
   the mobile device includes a speaker;
   the pediatric disease simulation feedback logic section of the interactive medical procedure simulation logic section is configured to cause the speaker of the mobile device to provide the audio feedback to the user patient associated with the virtual medical care provided to the body of the plush toy; and
   the pediatric disease simulation feedback logic section of the interactive medical procedure simulation logic section is configured to cause the display screen of the mobile device to provide the visual feedback to the user patient associated with the virtual medical care provided to the body of the plush toy.

8. The system of claim 1, wherein the one or more digital virtual medical tools includes at least one of a digital virtual inhaler, a digital virtual nebulizer, a digital virtual blood pressure monitor, a digital virtual thermometer, or a digital virtual X-ray machine.

9. The system of claim 1, wherein:
   the one or more digital virtual medical tools includes a digital virtual insulin pen having a digital virtual cap;

the digital virtual medical tools logic section is configured to cause the digital virtual insulin pen having the digital virtual cap to be displayed superimposed over the still frame;

the digital virtual medical tools logic section is configured to receive one or more sliding gestures from the user patient via the touch-sensitive display screen to remove the digital virtual cap from the digital virtual insulin pen;

the one or more digital virtual medical tools includes a digital virtual rubbing alcohol swab;

the digital virtual medical tools logic section is configured to cause the digital virtual rubbing alcohol swab to be displayed superimposed over the still frame; and the digital virtual medical tools logic section is configured to receive one or more touch and move gestures from the user patient via the touch-sensitive display screen to cause the digital virtual rubbing alcohol swab to clean a tip of the digital virtual insulin pen.

10. The system of claim 9, wherein:

the one or more digital virtual medical tools includes a digital virtual needle;

the digital virtual medical tools logic section is configured to cause the digital virtual needle to be displayed superimposed over the still frame;

the digital virtual medical tools logic section is configured to receive one or more touch and move gestures from the user patient via the touch-sensitive display screen to cause the digital virtual needle to be attached to an end of the digital virtual insulin pen;

the one or more digital virtual medical tools includes a digital virtual dial;

the digital virtual medical tools logic section is configured to cause the digital virtual dial to be displayed superimposed over the still frame; and the digital virtual medical tools logic section is configured to receive one or more dial gestures from the user patient via the touch-sensitive display screen to cause the digital virtual dial to show a digital virtual dosage of digital virtual insulin.

11. The system of claim 10, wherein the digital virtual medical tools logic section is configured to receive one or more gestures from the user patient via the touch-sensitive display screen to cause the digital virtual insulin to be administered to the plush toy.

12. The system of claim 1, wherein:

the series of live images is referred to as a first series of live images;

the particular patch is referred to as a first particular patch;

the medical procedure is referred to as a first medical procedure;

the still frame is referred to as a first still frame;

the visible light camera of the mobile device is configured to capture a second series of live images of the plush toy including the one or more patches;

the mobile device is configured to display the second series of live images on the display screen of the mobile device; and the interactive medical procedure simulation logic section is configured to cause a second particular patch from among the one or more patches within the second series of live images to be scanned, and to initiate an interactive augmented reality experience to simulate a second medical procedure for pediatric disease education responsive to the scanned second particular patch.

13. The system of claim 12, wherein:

the one or more digital virtual medical tools includes a digital virtual lancing device, a digital virtual strip, and a digital virtual glucometer;

the digital virtual medical tools logic section is configured to cause at least one of the digital virtual lancing device, the digital virtual strip, or the digital virtual glucometer to be displayed superimposed over a second still frame;

the digital virtual medical tools logic section is configured to receive one or more touch and move gestures from the user patient via the touch-sensitive display screen to cause the digital virtual lancing device to create a digital virtual prick to the plush toy, and to cause corresponding digital virtual blood to appear in an area that resembles a finger of the plush toy; and the digital virtual medical tools logic section is configured to receive one or more touch and move gestures from the user patient via the touch-sensitive display screen to cause the digital virtual strip to come into contact with the digital virtual blood, and to cause the digital virtual glucometer to measure a digital virtual blood sugar level of the plush toy.

14. The system of claim 13, wherein:

the digital virtual glucometer includes a digital virtual display;

the digital virtual glucometer is configured to display on the digital virtual display the digital virtual blood sugar level;

the mobile device includes a speaker; and the interactive medical procedure simulation logic section includes a pediatric disease simulation feedback logic section configured to cause the speaker of the mobile device to emit an audible confirmatory message as if it were coming from the plush toy.

15. The system of claim 13, wherein:

the mobile device includes a speaker;

the interactive medical procedure simulation logic section includes a pediatric disease simulation feedback logic section configured to cause the speaker of the mobile device to emit a message as if it were coming from the plush toy regarding at least one symptom of shakiness, dizziness, or confusion;

the interactive medical procedure simulation logic section includes a digital virtual food logic section configured to cause digital virtual food and a digital virtual plate to be displayed on the touch-sensitive display screen;

the digital virtual food logic section is configured to receive one or more touch and move gestures from the user patient via the touch-sensitive display screen to cause a selection of the digital virtual food to be moved onto the digital virtual plate; and the digital virtual food logic section is configured to receive one or more touch and move gestures from the user patient via the touch-sensitive display screen to cause the digital virtual plate having the digital virtual food to be moved toward a mouth of the plush toy to virtually feed the plush toy with the selection of the digital virtual food.

16. The system of claim 15, wherein the digital virtual food logic section is configured to cause a representation of a number of carbohydrates associated with the selection of the digital virtual food on the digital virtual plate to be displayed on the touch-sensitive display screen.

* * * * *